United States Patent [19]

Christenson

[11] Patent Number: 5,713,424
[45] Date of Patent: Feb. 3, 1998

[54] TAG AXLE LATCHING MECHANISM

[75] Inventor: Ronald E. Christenson, Parsons, Tenn.

[73] Assignee: McNeilus Truck and Manufacturing, Inc., Dodge Center, Minn.

[21] Appl. No.: 554,928

[22] Filed: Nov. 9, 1995

Related U.S. Application Data

[63] Continuation-in-part of Ser. No. 455,839, May 31, 1995, Pat. No. 5,516,135.

[51] Int. Cl.$^6$ ................................................. B62D 61/12
[52] U.S. Cl. ..................... 180/24.02; 180/209; 280/704
[58] Field of Search .............................. 180/24.02, 209; 280/81.1, 405.1, 704, 711, DIG. 1, 43.23, 404; 298/22 P, 23 R, 235, 1 R

[56] References Cited

U.S. PATENT DOCUMENTS

| | | | |
|---|---|---|---|
| 3,272,552 | 9/1966 | Park | 296/56 |
| 3,440,763 | 4/1969 | O'Brien | 296/56 |
| 3,757,969 | 9/1973 | Smith | 296/56 |
| 3,873,149 | 3/1975 | Churchman | 296/56 |
| 4,307,541 | 12/1981 | Farmer et al. | 296/56 |
| 4,940,287 | 7/1990 | Ritchie | 180/24.02 X |
| 5,018,755 | 5/1991 | McNeilus | 280/81.1 |
| 5,090,495 | 2/1992 | Christenson | 180/24.02 |
| 5,141,280 | 8/1992 | Gerrard | 296/56 |
| 5,458,355 | 10/1995 | Young | 180/24.02 X |
| 5,597,174 | 1/1997 | Christenson et al. | 180/24.02 X |

FOREIGN PATENT DOCUMENTS

| 1017767 | 9/1977 | Canada | 180/209 |
|---|---|---|---|

Primary Examiner—Kevin Hurley
Attorney, Agent, or Firm—Haugen & Nikolai, P.A.

[57] ABSTRACT

A tag axle latching mechanism for a tailgate-mounted tag axle system includes opposed matching engaging components attached to a tag axle system and to a truck frame for directing supporting forces associated with the tag axle system, as deployed, through the truck frame. The tag axle system is suspended from a tailgate such that the engaging components self-align as the tailgate is operated between closed, lowered and raised, open, positions. Mechanized locking devices lock the engaged components in place.

13 Claims, 26 Drawing Sheets

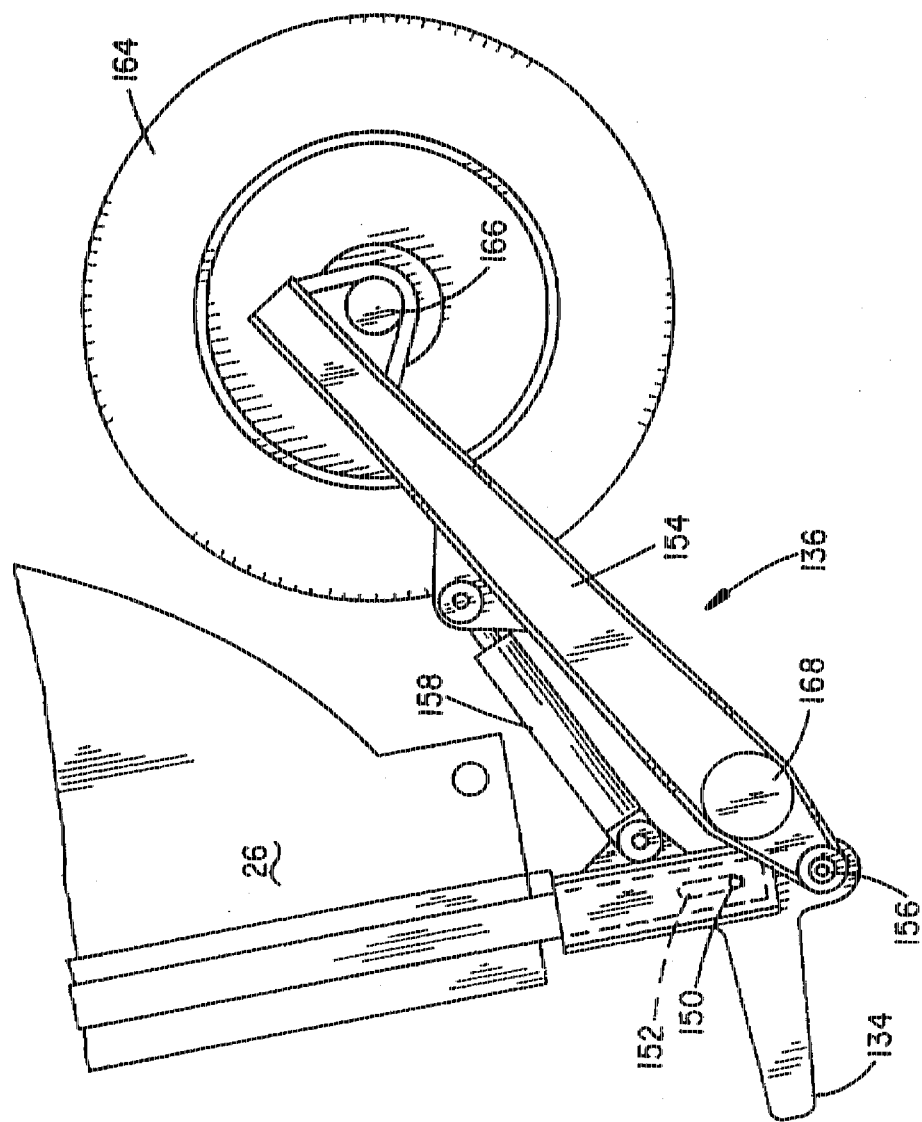
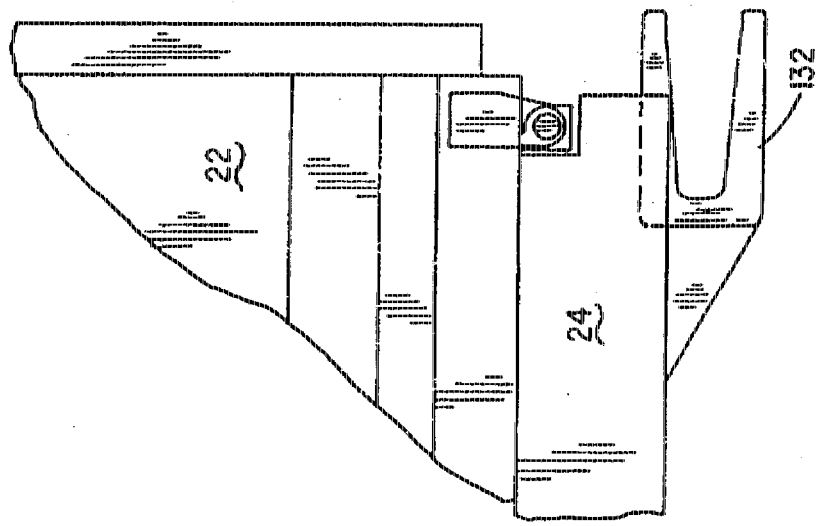
FIG. 17

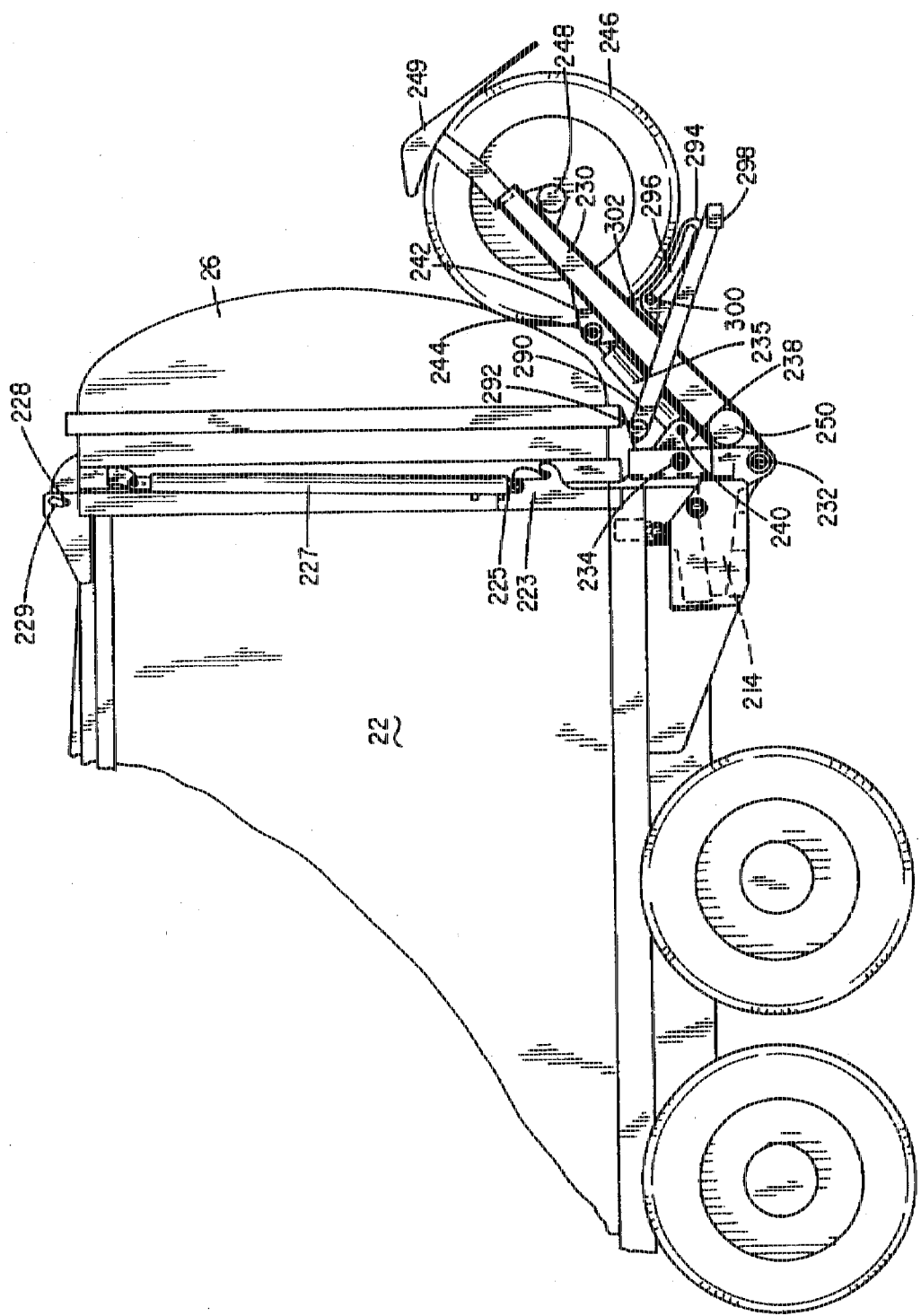

TAG AXLE LATCHING MECHANISM

CROSS-REFERENCE TO RELATED APPLICATION

The present application is a continuation-in-part of my co-pending application Ser. No. 08/455,839, filed May 31 1995, and now U.S. Pat. No. 5,516,135, entitled "TAX AXLE LATCHING MECHANISM".

BACKGROUND OF THE INVENTION

I. Field of the Invention

This invention relates generally to latching mechanisms associated with tag axles for vehicles and, more particularly, to a latching mechanism for latching a tailgate mounted tag axle to a vehicle frame.

II. Discussion of the Related Art

Auxiliary axle assemblies or tag axles augment the load carrying capabilities of load hauling vehicles. Tag axle assemblies carry wheels which may be optionally deployed to a ground engaging position or raised to a stowed position. In the ground engaging position, a tag axle system provides an additional supporting axle helping to redistribute the weight carried by the vehicle among the axles. This additional axle can be employed to increase the weight carrying capability of the vehicle and yet allow it to remain within a given per axle legal weight restriction. In some types of vehicles, such as rear discharging refuse trucks, a rearward directed load distribution predominates and it is advantageous to provide tag axle support as far rearward as possible.

Rear mounted tag axle systems may be attached to the frame or chassis of a vehicle or in a rear discharge vehicle, even to the tailgate. In some applications, a conventional frame mounted tag axle system would interfere with rearward directed unloading operations. To overcome this difficulty, the tag axle may be carried by or suspended from the tailgate so as to swing up and out of the way with the tailgate when the vehicle unloads. However, conventional tailgate hinges and latches are not built to carry the weight of or withstand the truck supporting forces associated with a ground engaging tag axle system and may pop open or fail during use.

Examples of tailgate hinges and latches may be found in U.S. Pat. Nos. 4,307,541, 3,440,763 and 3,272,552 which describe tailgate latching mechanisms including a latch or pin connected to a pivoting mechanical linkage which is, in turn, attached to a corresponding hydraulic cylinder. As the cylinder is operated, the linkage pivots to open or close the tailgate latch. The tailgate pivots open or closed from hinges situated at the top of the vehicle body.

More examples can be found in U.S. Pat. Nos. 5,141,280, 3,873,149 and 3,757,969 which describe tailgate latching mechanisms wherein the tailgate is hung from vertically displaceable hinges. In each of these patents, hydraulic cylinders lift the tailgate vertically from a closed and latched position before swinging the tailgate open.

Similarly, in U.S. Pat. No. 5,335,958, issued to Christenson (the inventor in this application) et al. and commonly assigned with the present invention, hydraulic cylinders raise the tailgate to unlock interlocking side latches before swinging the tailgate open. The latching mechanism described includes a pair of self-aligned vertical stops to prevent vertical displacement of the tailgate when closed. The vertical stops are automatically disengaged as the hydraulic cylinders extend to open the tailgate.

There remains however a need in the art to provide a tailgate mounted tag axle system that transfers the supportive forces to the truck frame to preserve the advantage that the tag axle does not interfere with unloading yet overcomes the drawback associated with supporting forces operating on the tailgate. Remote and jam-proof operation are also desireable attributes.

OBJECTS

Accordingly a principal object of the invention is to provide a tag axle latching mechanism which directs the supporting forces associated with a tailgate mounted tag axle through the frame of the vehicle.

Another object of the invention is to provide a tag axle latching mechanism for latching a tailgate mounted tag axle system to the frame of a vehicle including means for preventing vertical displacement of the tailgate.

A further object of the invention is to provide a tag axle latching mechanism that is remotely operable and jam-proof.

Still another object of the invention is to provide a tag axle latching mechanism associated with a tag axle suspended from a vertically displaceable tailgate and including a mechanized device for securing the tag axle to the frame of the vehicle and preventing vertical displacement of the tag axle latching mechanism and tailgate such that the supporting forces associated with the tag axle system in the ground engaging position are directed entirely through the frame of the vehicle.

Other objects, features and advantages of the present invention will become apparent to those skilled in the art through familiarity with the summary of the invention, detailed description, claims and drawings herein.

SUMMARY OF THE INVENTION

The foregoing objects of the present invention are attained by providing a tag axle latching mechanism which generally includes opposed matching engaging means or interlocking components attached to the frame of the vehicle and to the tag axle. The interlocking components are operated between a latched position and an open position. In the latched position, a positive vertical stop prevents substantial vertical movement of the interlocking components and directs forces from a ground engaging or stowed tag axle system to the frame mounted component and the frame of the vehicle. The tag axle is carried by but loosely suspended from the tailgate, i.e. mounted with sufficient play, such that in the latched position no forces are transferred from the tag axle latching mechanism to the tailgate. In the open position, the tag axle hangs from the tailgate and is lifted with the tailgate when it is opened to unload the vehicle. A latching mechanism of this type is attached to each side of the load hauling vehicle for securing the tag axle to the vehicle. The mechanism may be characterized by a variety of embodiments.

In one embodiment, two vertically aligned and spaced upward facing hooks are securely mounted to the frame of the vehicle to interlock with two vertically aligned and spaced downward facing hooks fixed to the tag axle assembly. A lock pin inserted between the lower tag axle mounted hook and the top frame mounted hook secures the hooks together. In the tag axle ground engaging position, forces from the tag axle wheel are transferred from the tag axle hooks through the lock pin and the frame mounted hooks to the truck frame. The tag axle assembly is mounted on and carried by the tailgate, loosely mounted or suspended, such as with bolts through over-sized holes, on the lower end of the tailgate such that the tag axle is sufficiently adjustable on the tailgate mount so that in the latched position, supporting forces associated with the tag axle are not applied to the tailgate, but instead are diverted to the frame of the truck.

Other embodiments involve tongue and socket arrangements in which a beveled socket is typically attached to the vehicle frame and a corresponding tongue is attached to the tag axle. The tongue and socket are operated between an inserted or latched position and an open position. The socket may have an inner cavity which narrows or tapers to a minimum width and widens slightly thereafter and accomodates a tongue of similar configuration. In the latched position, the tongue and socket correspond such that, in the supporting position, forces from the tag axle wheel skew the top of the tag axle tongue base and the bottom of the tongue tip against the frame mounted socket to lock the tongue in place. In the latched and stowed position, the tag axle rests on the frame mounted socket. The tag axle is loosely mounted to the tailgate, such as with a bolt attached to the tag axle and projected through a slot in a tailgate mounted support bar. In the latched position no forces are transferred to the tailgate and in the open position the tag axle hangs on the tailgate to be lifted clear of the exposed opening with the tailgate for unloading the vehicle.

In an alternate embodiment, a tapered torque tongue attached to each tag axle wheel assembly which move vertically with the tailgate is used in conjunction with an oversized torque tongue pocket fixed to the vehicle frame and a linearly deployed mechanized locking pin is used to lock each tongue in place with the tailgate fully lowered. Each torque tongue is provided with a recess on an upper or lower surface thereof adapted to accept a generally horizontally deployed locking pin when the torque tongue is engaged in the pocket to lock each tag axle wheel to the chassis. A common linear operator may be employed to extend and withdraw aligned locking pins on either side of the truck chassis to thereby lock and unlock the tongues for a pair of spaced tag wheels. In this manner, a positive locking mechanism is provided in a tongue and socket mounting system that is otherwise sufficiently loose and free to move vertically with the tailgate to avoid jamming. The pair of spaced tag wheels may be joined by a torque tube to operate in unison with the latching mechanism and tailgate in a through axle arrangement.

In the embodiments described herein, the tailgate is a vertically disposed tailgate pivotally connected to the truck body by vertically displaceable hinges. The tailgate includes vertically spaced upper and lower pairs of side latches which fit into corresponding latches attached to the truck body and spaced hoops or stirrups along the bottom edge of the frame which engage spurs protruding in like spaced relation from the bottom of the tailgate. From the closed position, the tailgate is displaced or lifted vertically to clear the latches before being swung open. A latching link member which is pivotally connected to the truck body prevents vertical displacement of the tailgate in the closed position. A pair of hydraulic cylinders attached to the tailgate and the latching link member operate the tailgate. Extending the hydraulic cylinders pivots and unlocks the latching link member, vertically displaces the tailgate and swings it open. Such a tailgate latching system is further described and shown in the above-referenced U.S. Pat. No. 5,335,958, the disclosure of which is hereby incorporated by reference for any necessary purposes. Embodiments of the tag axle latching mechanism described herein are compatible with that tailgate but, of course, other tailgates would also function and a vertically displaceable tailgate is not required.

In a vertically displaceable tailgate and hook and lock pin combination, the tag axle hooks align with the frame mounted hooks and the tailgate drops vertically to interlock the hooks. The tag axle assembly is held securely in place by the interlocking hooks and the lock pin which retains the hooks in the interlocked position and prevents vertical displacement. The tailgate is held securely in place to withstand horizontal refuse compacting or packing forces by the tailgate upper and lower pairs of side latches and hoops or stirrups and spurs attached to the lower end of the tailgate and the truck frame. Lifting the tailgate vertically lifts the tag axle and unlatches the tag axle hooks from engagement with the frame hooks. An interlock may be provided to assure that the tag axle lock pin is disengaged before the tailgate is operated.

In the tongue and socket embodiments as used with a vertically displaceable tailgate, the tag axle hangs from an open tailgate such that the tongue aligns with and is received into the socket as the tailgate swings shut. In the case of the torque tongue and locking pin embodiments, the tailgate may be lifted only with the pins withdrawn or unlocked and the torque tongue is displaced vertically with the tailgate. This leaves the torque tongue clear of the pocket members and free to swing outward with the opening of the tailgate.

The tag axle system may be of any variety, including steerable stub axles mounted on independent pivots or a single through-axle type which may also be steerable. In example embodiments described herein, a through axle system is described mounted to the tailgate of a front loading refuse truck. The through axle is operated by either pneumatic springs or a double-acting hydraulic cylinder. Of course, on certain vehicles, such as rear loading refuse trucks, the dimensions of the tailgate may dictate the use of stub axles. The vehicle may be any vehicle having a tailgate, including side loading or rear loading refuse trucks.

BRIEF DESCRIPTION OF THE DRAWINGS

FIG. 17 is a side view similar to FIG. 13 showing the tailgate partially open;

FIG. 26 is a view similar to FIG. 24 with the tag axle in the raised or stowed position.

DETAILED DESCRIPTION

Figure 1:
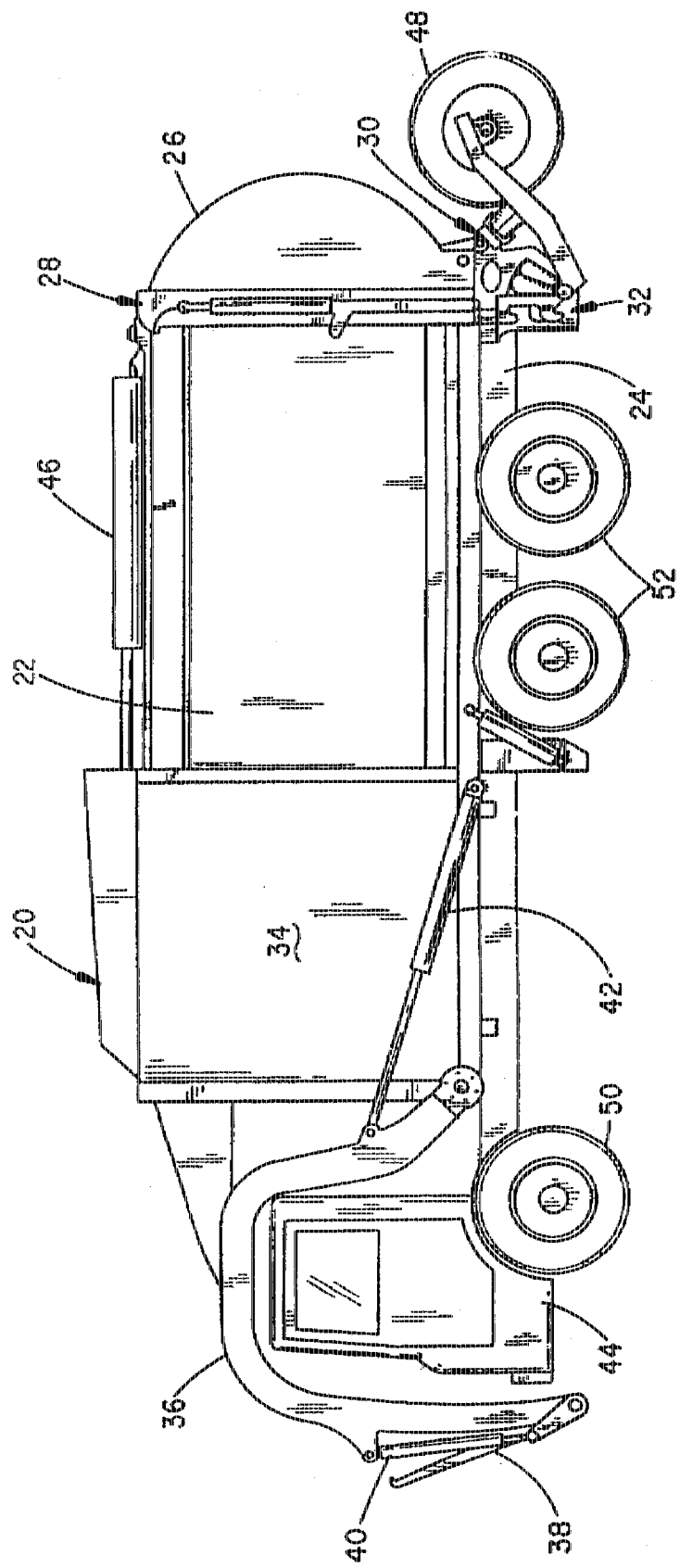
FIG. 1 is a side view of a front loading refuse truck including a tag axle latching mechanism of the present invention and showing a tag axle system in the stowed position.
Figure 2:
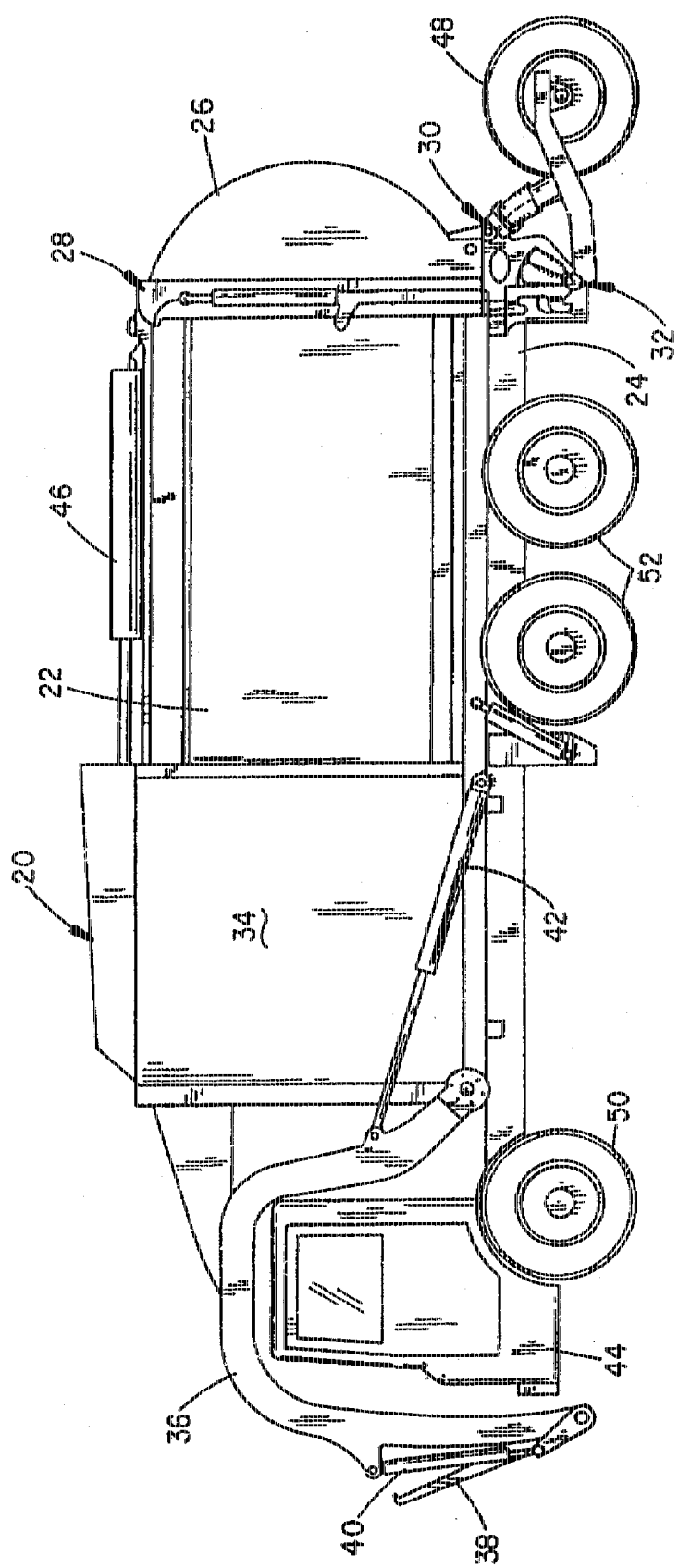
FIG. 2 depicts the truck of FIG. 1 with the tag axle system in the ground engaging (deployed) position.
Figure 3:
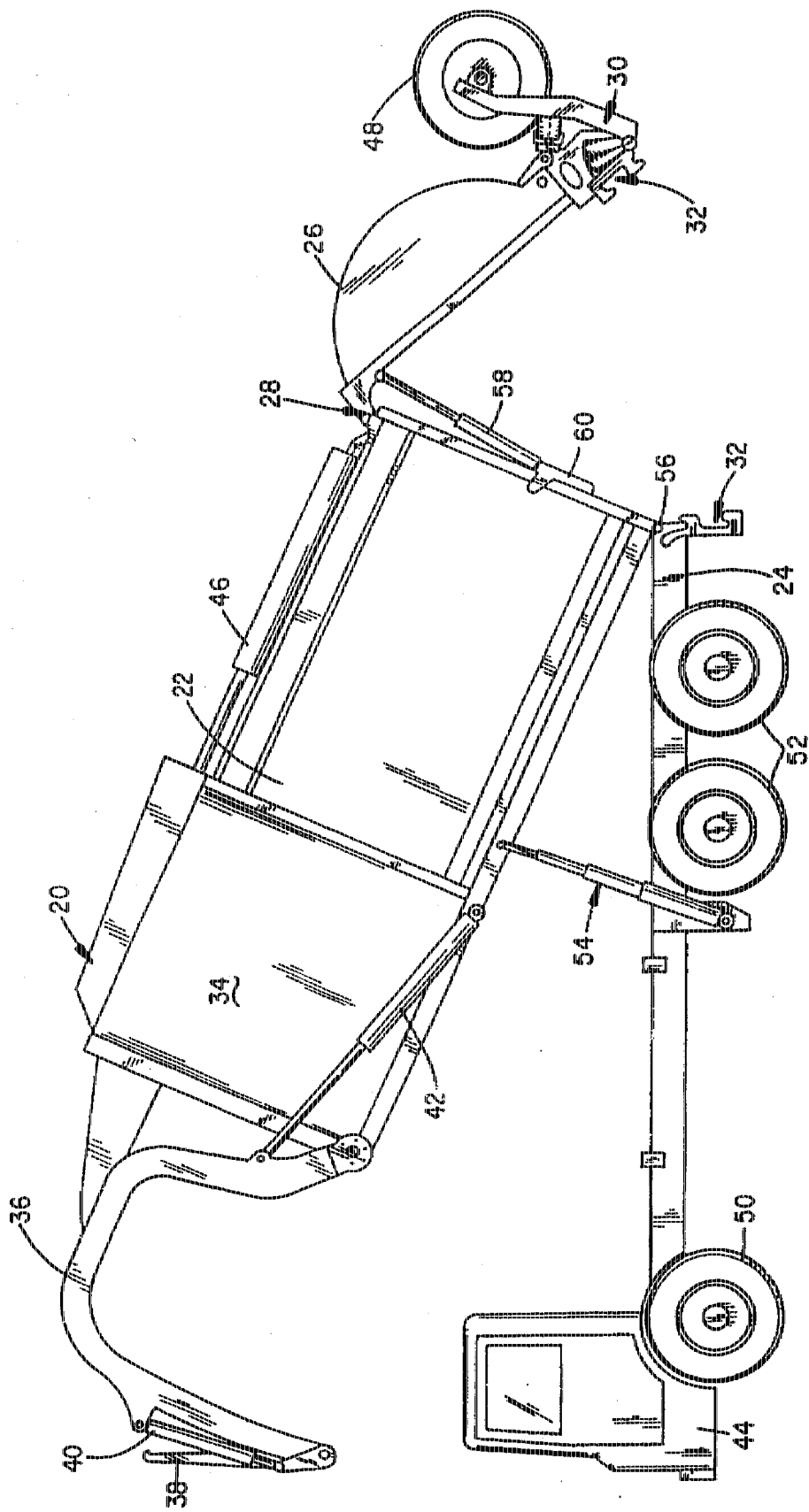
FIG. 3 depicts the truck of FIG. 1 showing the tag axle system in the stowed position and the tailgate and body raised as for unloading.

FIGS. 1–3 depict one side of a front loading refuse truck 20 which includes a truck frame or chassis 24 and a tag axle latching mechanism in accordance with the present invention, indicated generally by the numeral 32. The latching mechanism 32 detachably connects a tag axle 30 to the truck frame 24. The truck 20 includes a material holding body 22 and a refuse hopper 34 mounted on the truck frame 24. The tag axle assembly 30 is adjustably connected or loosely mounted to the lower end of a large tailgate 26 which has an arcuate outer metal skin and is pivotally connected to each side of the body 22 at the top thereof by a pair of spaced hinge mechanisms 28. The truck includes a pair of heavy lift arms as at 36 pivotally attached to the refuse hopper 34 of the truck body. A refuse box engaging means or forks 38 are pivotally attached to the lift arms 36 and lift and dump cylinders 42 and 40 operate to lift refuse boxes over a forward cab section 44 and empty them into the refuse hopper 34. An horizontal hopper cover (not shown) is slidably engaged over the refuse hopper 34 and operated by hopper cover hydraulic cylinder 46. Front and rear wheels are shown at 50 and 52. A hydraulically-operated packer blade (not shown) forces the hopper contents rearward into the body 22 to eventually compact it against the arcuate tailgate 26 in a well-known manner. Thus, the load is carried rearward in the refuse truck 20 and most of the weight is shifted to the rear wheels 52.

In FIG. 2, the tag axle assembly 30 is shown lowered to a ground engaging (or supporting) position to offset increased weight aft and help to redistribute the weight of a loaded vehicle among all axles. As described below, the tag axle latching mechanism 32 assures that supporting forces associated with the ground engaging wheel 48 are applied through the truck frame 24 and not the tailgate 26.

As shown in FIG. 3, the body 22 can be raised to an unloading position by extending body lift hydraulic cylinder(s) 54 to pivot the body 22 at pivot(s) 56. The lift and dump mechanism 36 and the refuse hopper 34 may alternatively be configured to remain in place on the truck frame 24 or attached to be lifted with the body 22 into a raised position as shown. Tag axle assembly 30 is lifted with tailgate 26 which is opened by tailgate hydraulic cylinder 58. The tag axle 30 may be raised to the stowed position before the tailgate 26 is opened. Opening the tailgate 26 lifts the tag axle assembly 30 away from the opening and prevents interference with the unloading operation.

Figure 4:
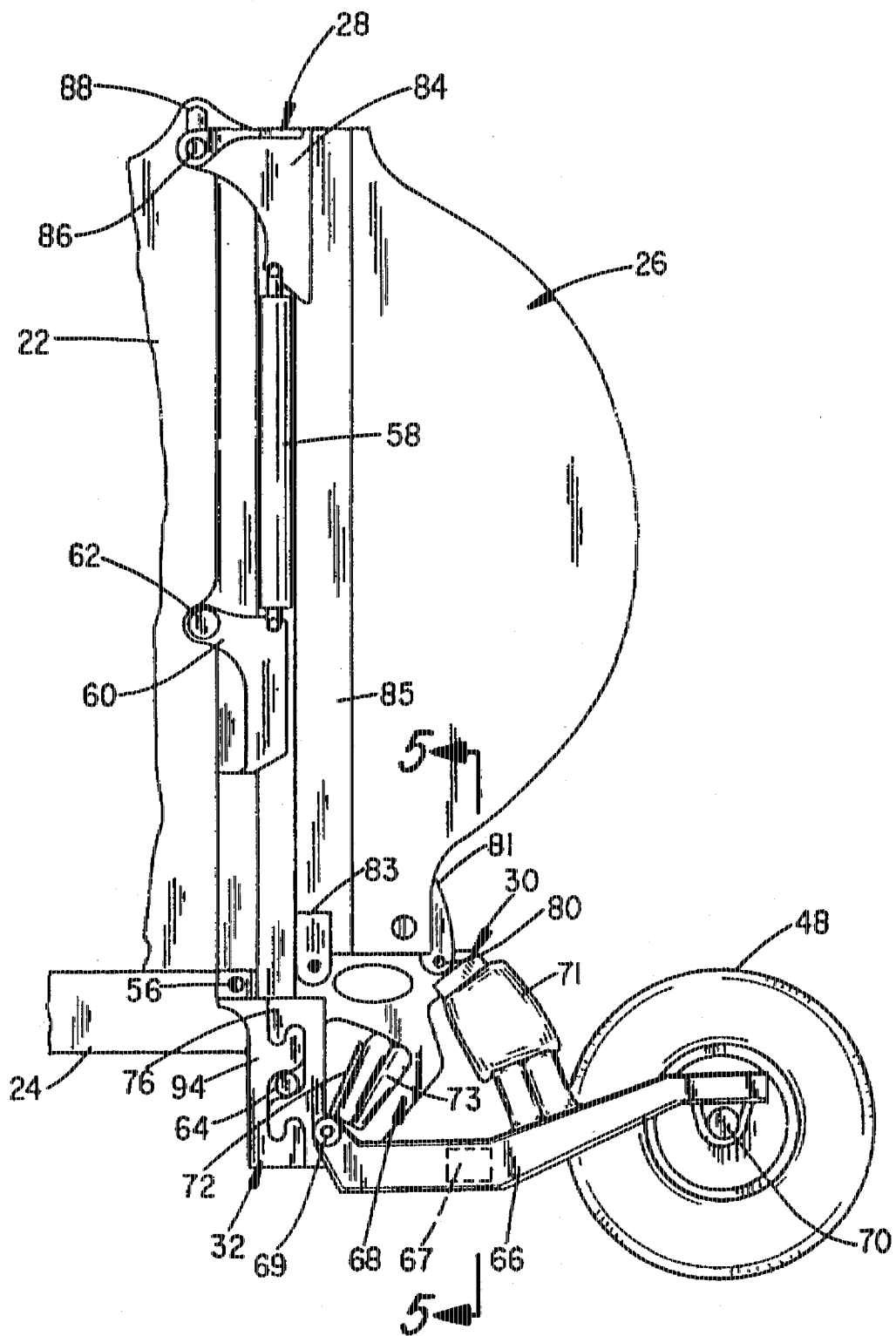
FIG. 4 is an enlarged fragmentary view of the rear of the truck of FIG. 2 showing portions of the tailgate latching mechanism and a hook and lock pin embodiment of the tag axle latching mechanism.

In one embodiment of the present invention, as shown in FIG. 4, the tag axle latching mechanism 32 includes a tag axle double hook 76 attached to the tag axle 30 and a frame mounted double hook 94 attached to the truck frame 24. The hooks 76 and 94 are locked into a closed or latched position by a lock pin 64 which is slidably inserted therebetween.

Each tag axle assembly 30 may be of any type; and, as shown, include a mounting lever 66 pivotally attached to a tag axle frame 68 at a lever arm pivot 69. A through axle 70 is connected between axle mounting levers 66 situated on each side of the refuse truck 20 carries wheels one of which is shown at 48. A cross tube or torque tube member 67, (FIG. 5), is attached to the axle mounting levers 66 situated on each side of the truck 20 for stabilizing the system and coordinating operation of the system. Fluid operated actuators 71 and 73, which may be pneumatic springs or bellows, move the axle mounting lever 66 between the deployed position, FIGS. 2 and 4, and the stowed position, FIGS. 1 and 3. Lowering pneumatic spring 71 is connected to the tag axle frame 68 and the axle mounting lever 66 to force the wheel 48 into the ground engaging position as it expands. Torque lever arm 72 is securely attached to the axle mounting lever 66 to pivot 69 therewith and raising pneumatic spring 73 is attached to the torque lever arm 72 and the tag axle frame 68 to raise the wheel 48 as it expands.

As shown in FIG. 4, the tailgate 26 includes a peripheral steel frame 85 having heavy gusset-like hinge members 84 attached thereto and pivotally connected to the body 22. Tailgate hinge pins 86 ride in vertically slotted openings 88 situated on each side of the refuse truck 20 at the top of the body 22. The tailgate hydraulic cylinders 58 are pivotally attached to hinge members 84 and latching link member 60.

Figure 5:
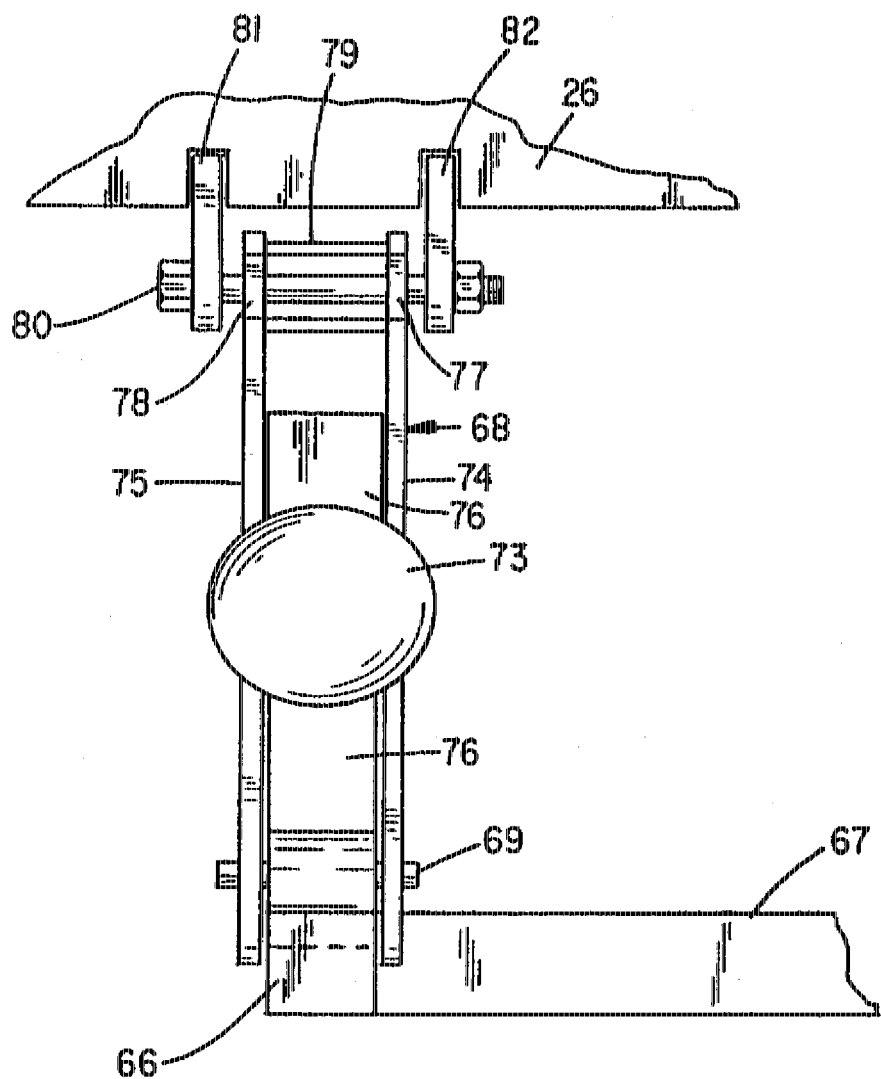
FIG. 5 is a greatly enlarged fragmentary detail rear view of one side of the truck of FIG. 1 taken along the line 5—5 of FIG. 4 showing the tag axle and tailgate mount.

As depicted in FIGS. 4 and 5, the tag axle frame 68 is adjustably connected to the tailgate 26 at first tag axle mounts 81 and 82, situated toward the rear of the lower part of the tailgate 26, and second tag axle mounts, indicated generally by 83, situated toward the front. The tag axle is mounted similarly at each set of mounts wherein the tag axle frame 68 is made up of two side pieces 74 and 75 securely attached, such as by welding, to a tag axle mounted double hook 76. The side pieces 74 and 75 extend above the double hook 76 and are provided with over-sized holes 77 and 78 at the top thereof. An over-sized tube 79 is secured, such as by welding, therebetween and tailgate tag axle mounts 81 and 82 are secured, as by welding, to the tailgate 26. A bolt 80 connects the tag axle frame 68 to the tailgate 26 through the over-sized holes 77 and 78 and the over-sized tube 79.

Figure 6:
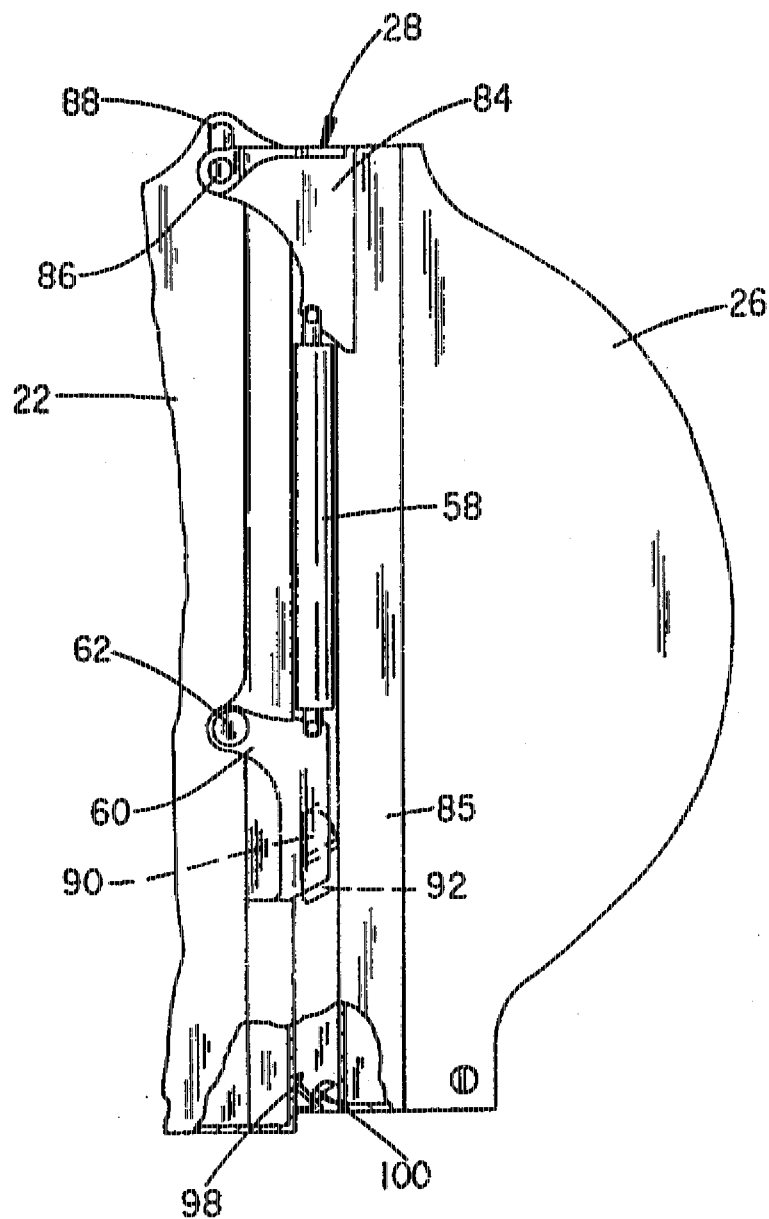
FIG. 6 is a greatly enlarged, partially cut-away, fragmentary side view of the tailgate of the truck of FIG. 1 without the tag axle system and latching mechanism showing the tailgate vertical stops in dashed lines and a hoop and spur.

As shown in FIG. 6, tailgate 26 is locked into position with latching link member 60 which is pivotally connected at pivot pin 62 to the body 22. The latching link member 60 includes a vertical stop 90 attached thereto for locking with a corresponding tailgate vertical stop 92 attached to the steel frame 85 of the tailgate 26. With the latching link member 60 in the vertical position, vertical stop 90 is directly above vertical stop 92 to prevent upward displacement of the tailgate 26. A plurality of hoops or stirrups 98 are attached to the lower end of the body 22 to interlock with spurs 100 attached to the tailgate frame 85. The stirrups 98 and spurs 100 assist in guiding the tailgate 26 into alignment for latching and maintain closure along the bottom edge of tailgate 26.

Figure 7:
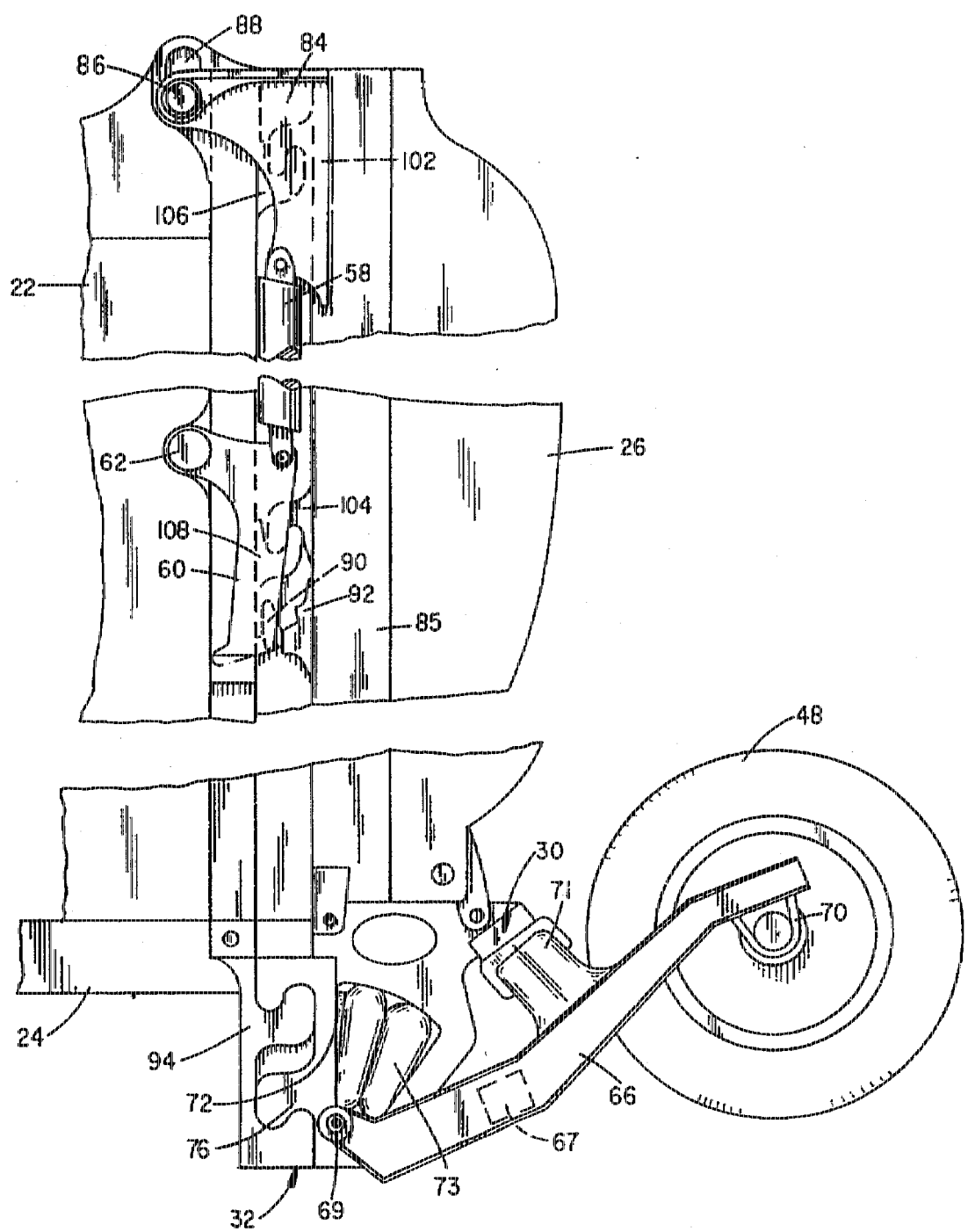
FIG. 7 is a greatly enlarged, broken fragmentary side view showing the latching link member and the hook and lock pin tag axle latching mechanism unlocked, and also showing the tailgate latching mechanism partially in dashed lines.
Figure 8:
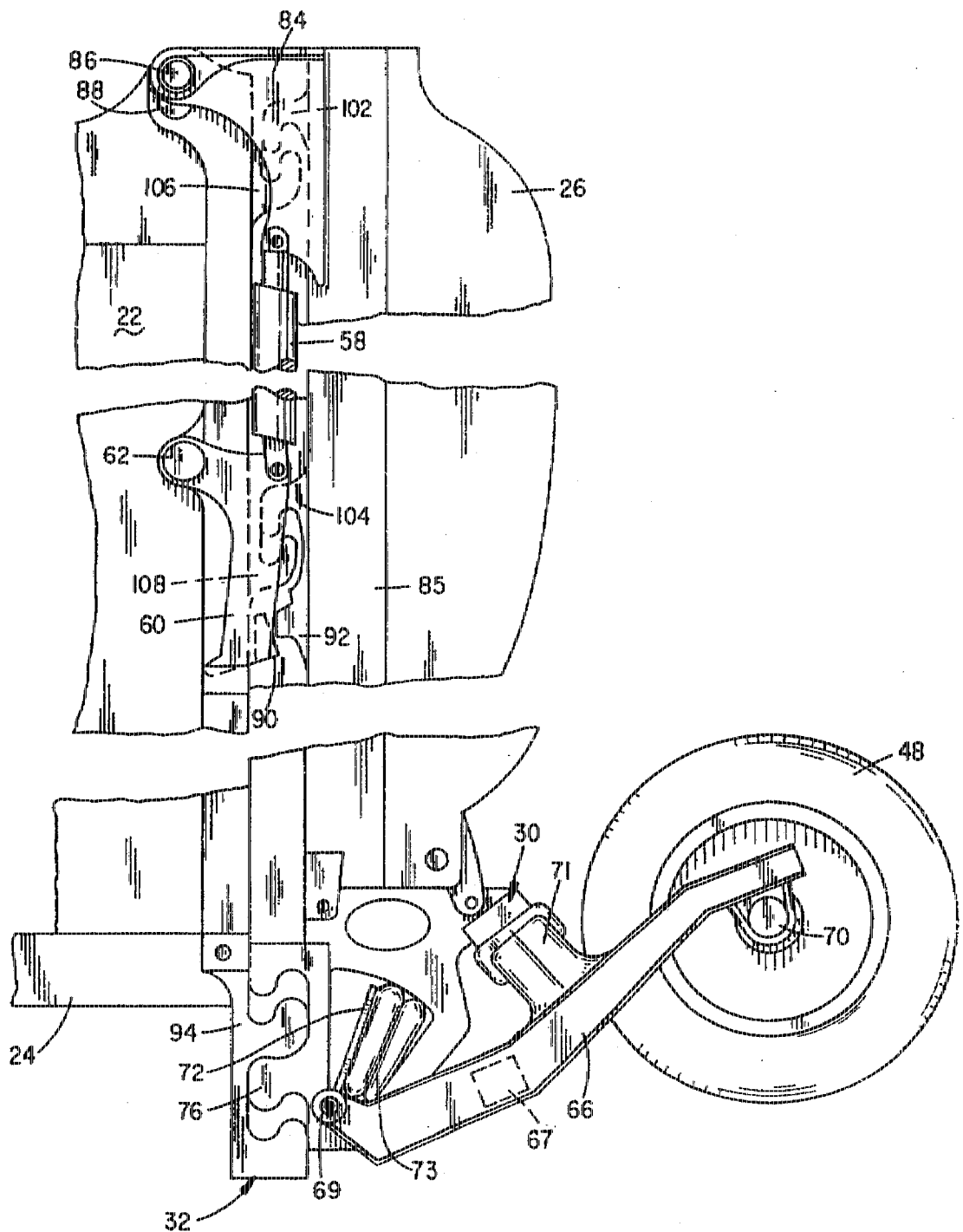
FIG. 8 is a view similar to FIG. 7 showing the tailgate and tag axle latching mechanisms displaced vertically.
Figure 9:
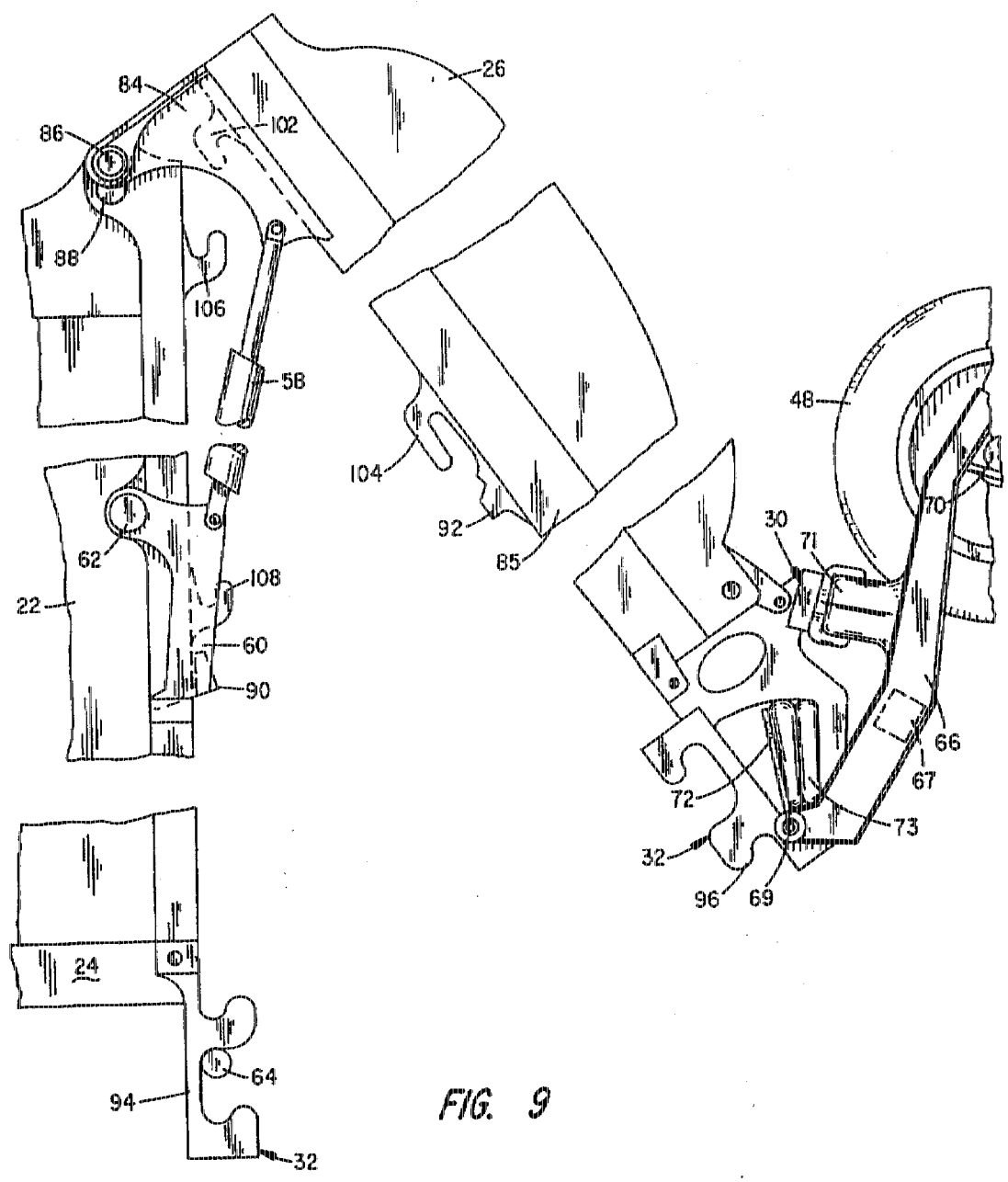
FIG. 9 is a slightly reduced view similar to FIG. 8 showing the tailgate swung partially open.

The greatly enlarged views of FIGS. 7–9 illustrate how the tailgate 26 and the tag axle assembly 30 engage and latch to the truck body 22 and frame 24. The frame mounted double hook 94 which is securely attached to the truck frame 24 interlocks with the corresponding tag axle mounted double hook 76 fixed to the tag axle assembly 30. Lock pin 64 is inserted between the frame mounted hook and the tag axle mounted hook 76, e.g., FIG. 4, to prevent vertical movement of the tag axle 30 and to direct forces through the vehicle frame 24. The tag axle latching mechanism 32 is unlocked by withdrawing lock pin 64.

In operation, the tailgate 26 is unlocked and raised by extending hydraulic cylinder 58. Link member 60 pivots to disengage vertical stops 90 and 92 and the tailgate 26 continues to travel upward as hinge pin 86 is being displaced upward along slotted opening 88. This disengages tailgate upper and lower latching members 102 and 104 from body upper and lower latching members 106 and 108 and spurs 100 from the stirrups 98. Simultaneously, tag axle mounted hooks 76 disengage frame mounted hooks 94 (FIG. 8); and upon further extension of cylinder 58, the tailgate 26 swings open. In the raised and opened position (FIG. 9), the tailgate 26 and the tag axle 30 stand clear of the body 22 and tailgate hinge pin 86 is at the top of vertical slot 88.

Retracting cylinder 58 reverses the process and realigns the tailgate latching members 102 and 104 with the body latching members 106 and 108, the tag axle mounted hook 76 with the frame mounted hook 94, interlocks members 102 and 104 with members 106 and 108, and hooks 76 with hooks 94. The latching link member 60 is moved to vertical to lock vertical stop 90 above tailgate vertical stop 92 and lock pin 64 may be slid into engagement with hooks 94 and 76 to lock the tag axle latching mechanism 32.

Figure 10:
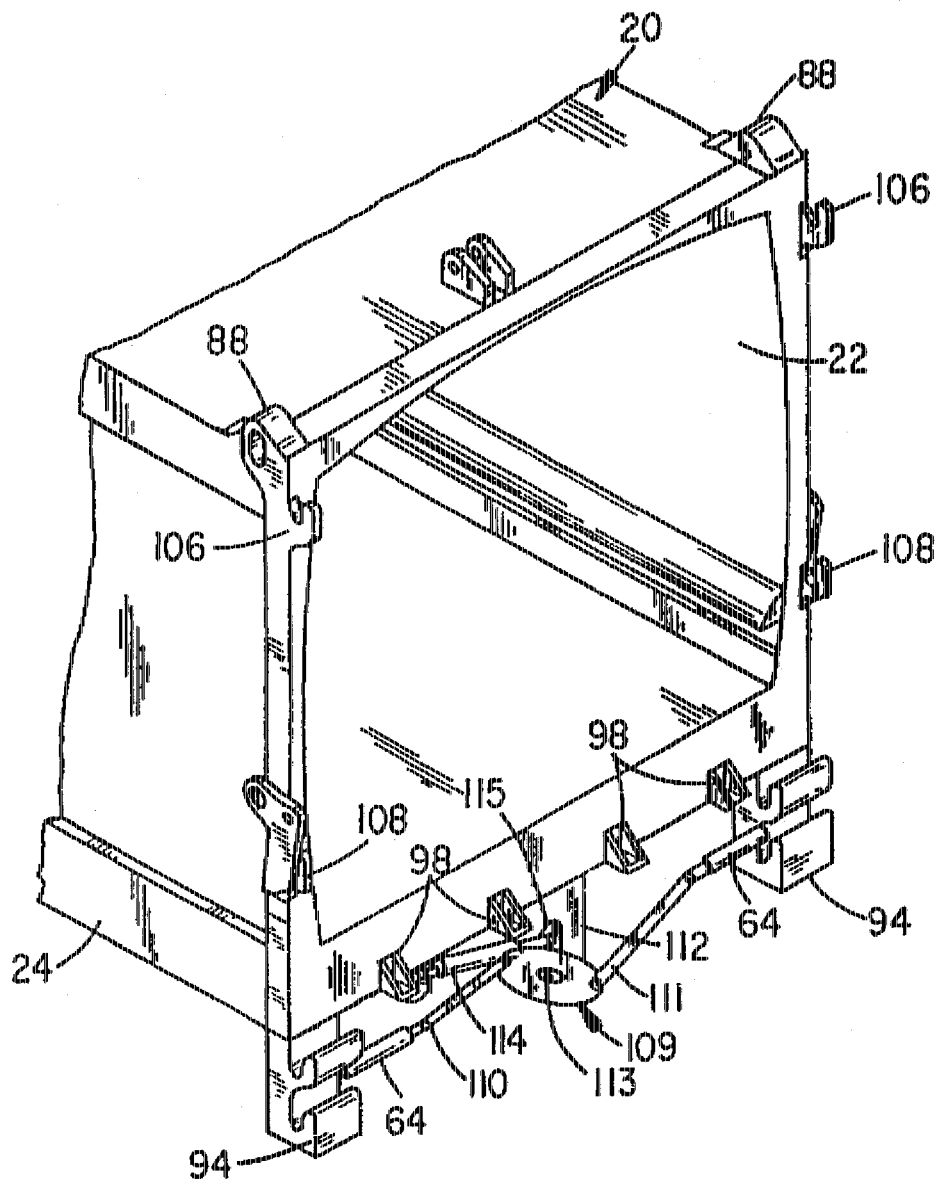
FIG. 10 is an enlarged fragmentary perspective view of the rear of the refuse truck with the tailgate removed and showing a slidable lock pin arrangement for a lock and pin latching arrangement.

The perspective view of FIG. 10 shows a slidable lock pin linking arrangement 109 which is mounted to the truck 20 in such a way that the lock pins 64 are aligned to slide underneath the upper hook of the frame mounted hooks 94. In one embodiment, the lock pin arrangement 109 includes connecting rods 110 and 111 pivotally attached between a common bell crank 112 and the lock pins 64. The bell crank 112 is connected to the truck 20 on shaft 113 and to a fluid operated cylinder, such as hydraulic cylinder 114 at pivot 115. Operating the cylinder 114 slides the lock pins 64 into and out of engagement with the tag axle latching mechanism 32. Movement of cylinder 114 may be coordinated with movement of cylinder 58 in such a way that the tag axle latches are unlocked before the tailgate latches are unlocked as the tailgate is opened and the tag axle latches are locked after the tailgate latches are locked as the tailgate is closed.

FIG. 10 also illustrates upper and lower latching members 106 and 108 on each side of the body 22. Across the bottom are four hoops or stirrups 98 and at the top are the spaced vertical slots 88 positioned on each side of the refuse vehicle 20.

Figure 11:
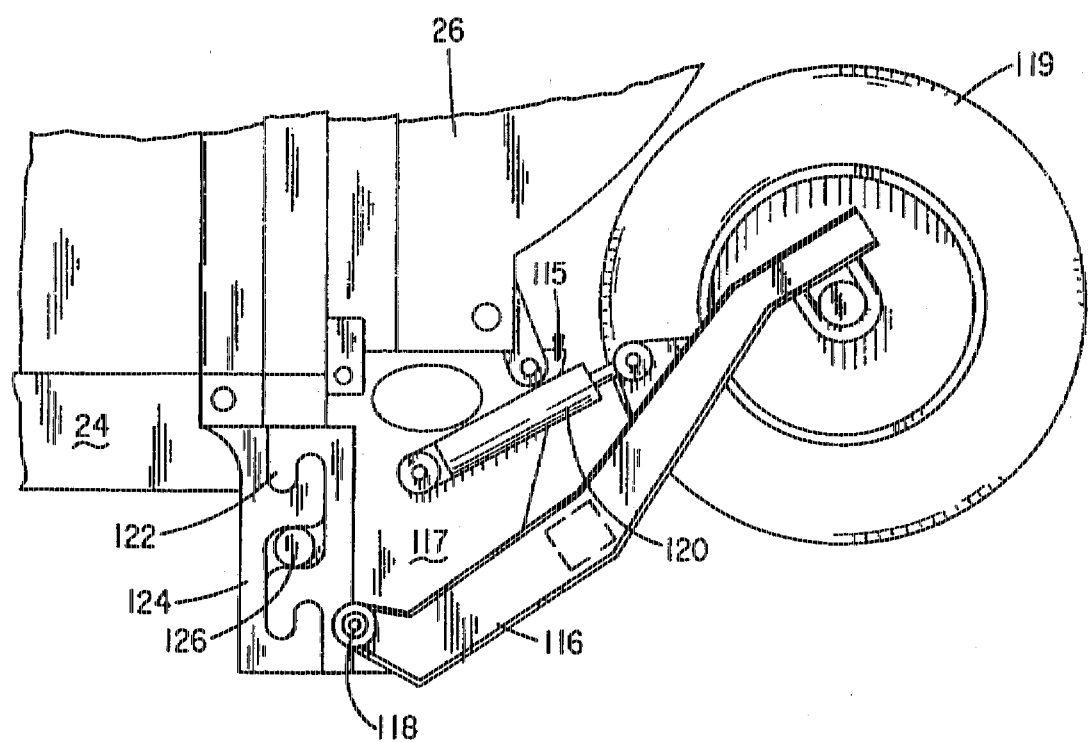
FIG. 11 is a greatly enlarged, fragmentary side view of the rear of a vehicle showing a hook and lock pin latching mechanism in conjunction with a cylinder operated tag axle assembly in the stowed position.
Figure 12:
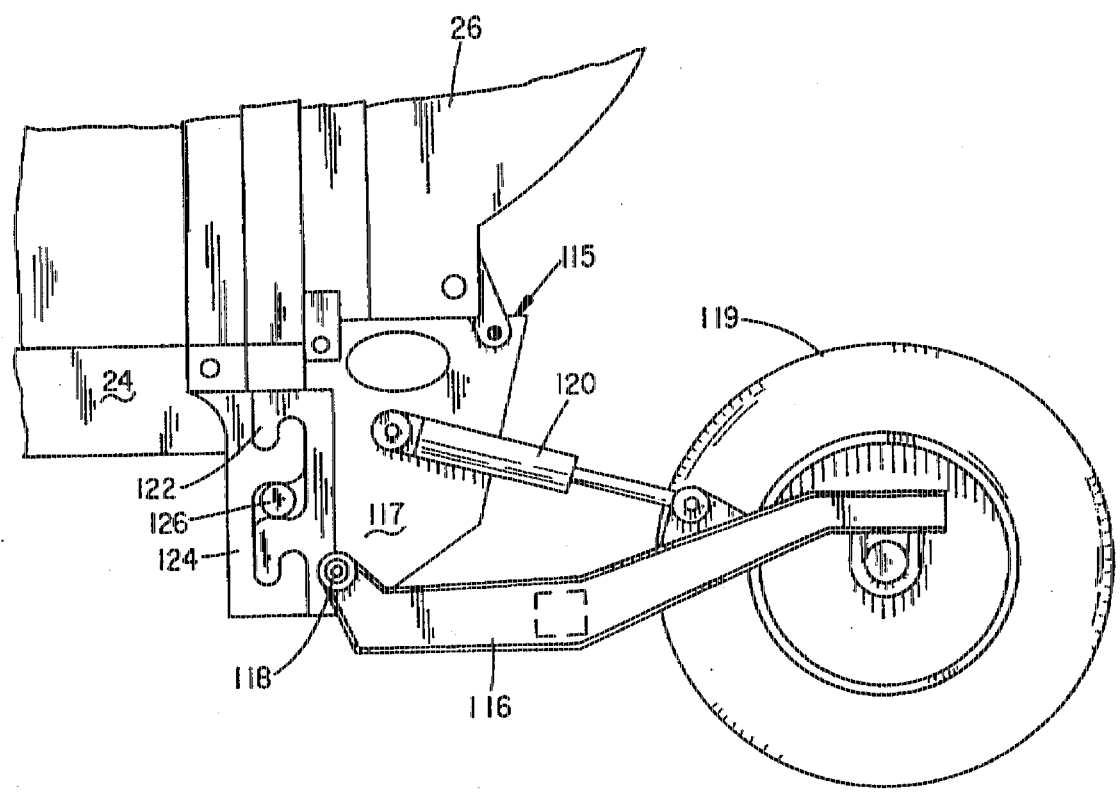
FIG. 12 is a view similar to FIG. 11 showing the tag axle assembly in the deployed position.

It will be appreciated that the pneumatic spring-operated tag axle 30 may be replaced with any suitable tag axle or tag axle deployment system, including steerable versions. For example, FIGS. 11 and 12 depict a double-acting hydraulic cylinder operated tag axle system 115 replacing the pneumatic system 30. The hydraulic system 115 includes an axle mounting lever arm 116 pivotally attached to the tag axle frame 117 with a suitable pivot pin 118. A ground engaging wheel 119 is mounted to the axle lever arm 116 which is, in turn, connected to a double-acting hydraulic cylinder 120 which is also connected to the tag axle frame 117 to move wheel 119 between a stowed position, as shown in FIG. 11, and the ground engaging position of FIG. 12. Tag axle mounted hook 122 which engages frame mounted hook 124 is attached to the tag axle frame 117. Lock pin 126 engages the hooks 122 and 124 to maintain them in a locked position and direct forces through the ground engaging wheel 119 to the frame 24. The hydraulic cylinder tag axle system 115 is loosely attached to the tailgate 26 which is raised and lowered for interlocking engagement.

Figure 13:
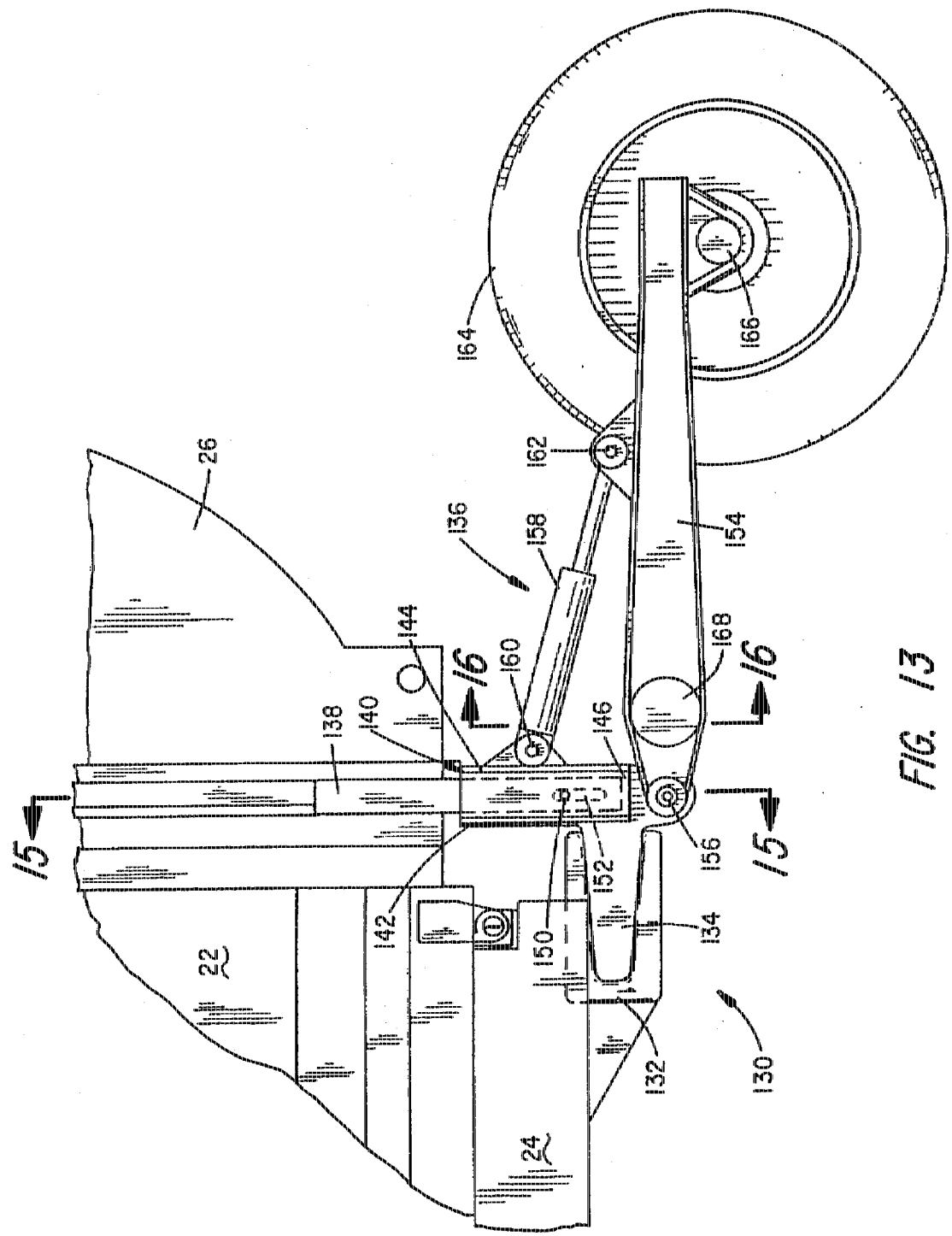
FIG. 13 is a greatly enlarged, fragmentary side view of the rear of a vehicle including a cylinder-operated tongue and socket tag axle latching mechanism in a deployed position.

In FIG. 13, a tag axle latching mechanism, indicated generally at 130, includes a socket 132 and a tongue 134 engaged therein. The socket 132 is secured to the truck frame 24 and the tongue 134 is secured to a tag axle, generally at 136. The tongue 134 and socket 132 correspond such that tongue 134 is slidably received in socket 132. The tag axle 136 is adjustably connected or loosely hung from the tailgate 26, which may be the vertically displaceable tailgate, illustrated as being attached to the truck body 22.

Figure 14:
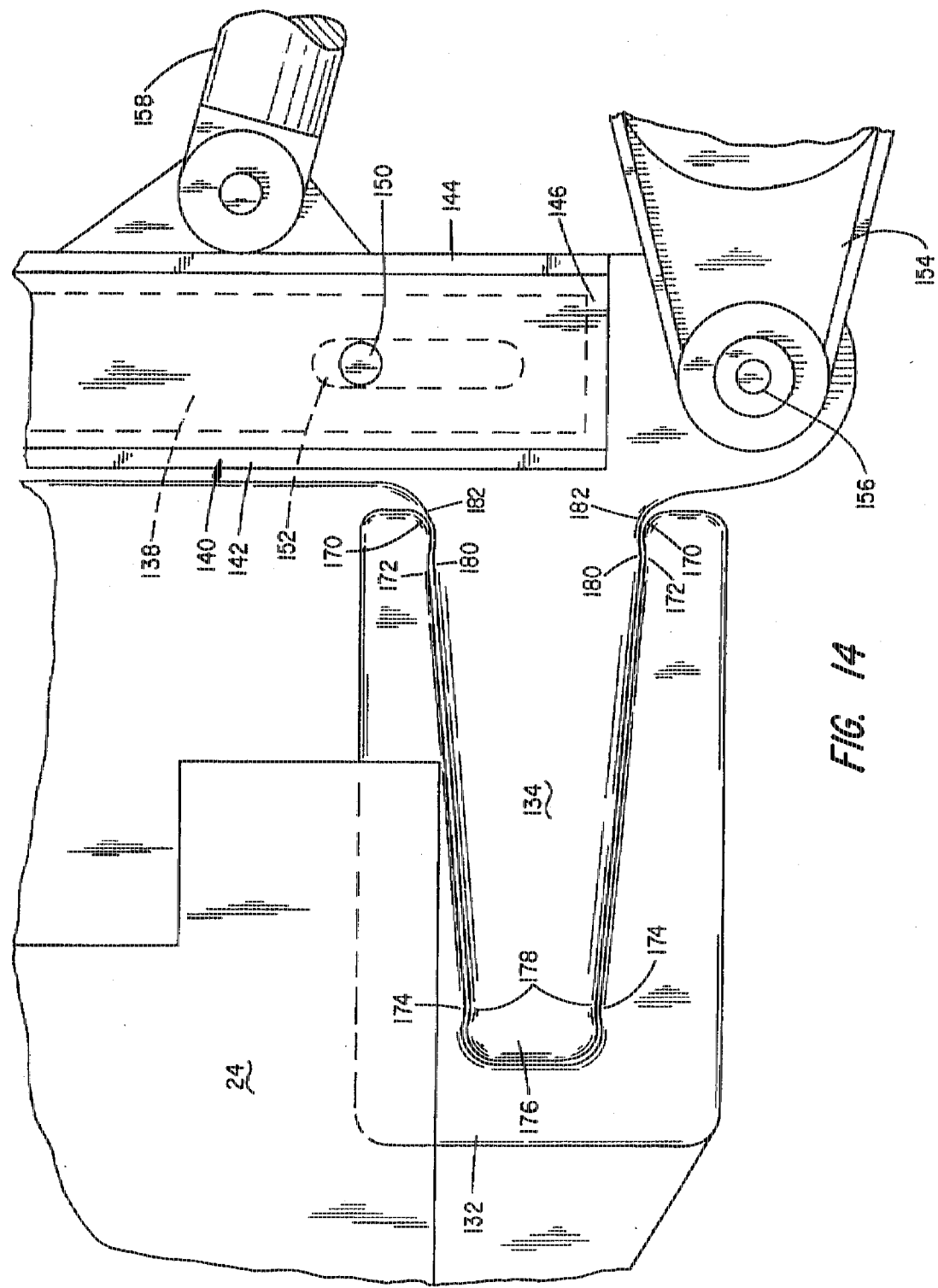
FIG. 14 is a magnified, fragmentary side view of the tongue and socket latching mechanism of FIG. 13 also showing the bolt and slot connecting the tag axle to the tailgate.
Figure 15:
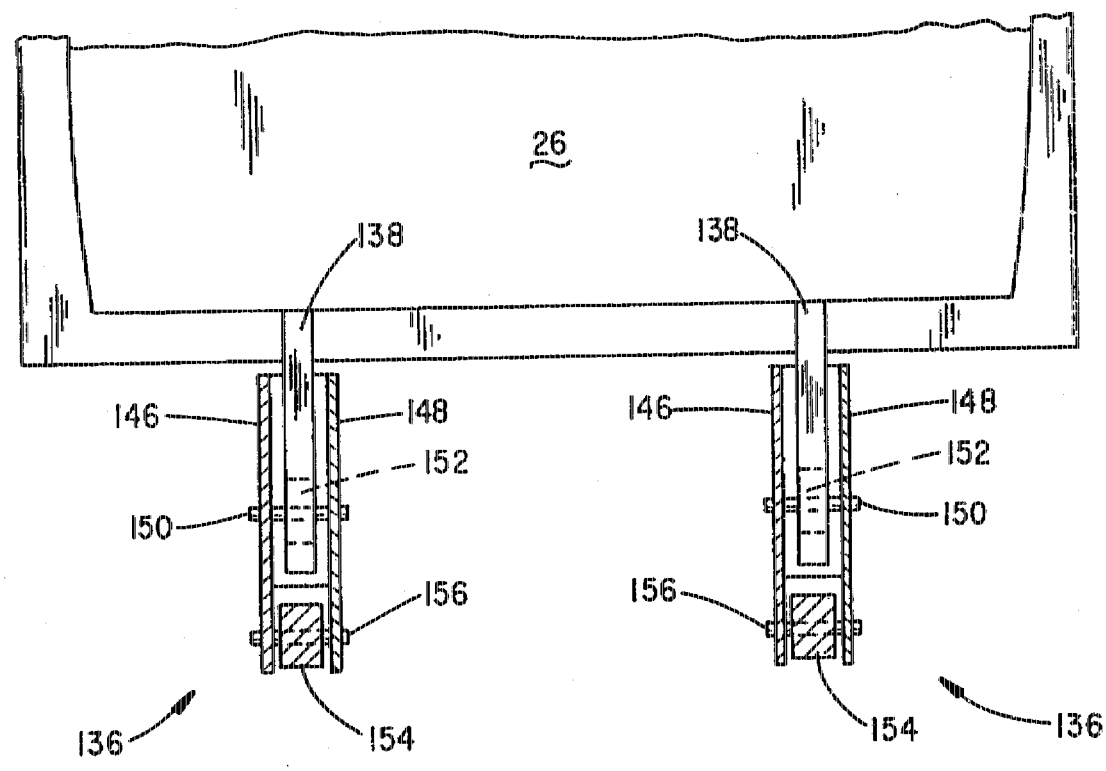
FIG. 15 is a fragmentary detail rear view taken along the line 15—15 of FIG. 13 showing the tag axle and tailgate mount.

FIGS. 13–15, further illustrate the attachment of the tag axle assembly 136 to the tailgate 26. A support bar 138 attached to the tailgate 26 carryies tag axle 136. The support bar 138 fits slidably into a rectangular tag axle support 140 which is an integral part of the tag axle 136. The tax axle support 140 includes front and rear slide plates 142 and 144 connected by slide plates 146 and 148 therebetween. A tag axle bolt or pin 150 attached to the side plates 146 and 148 extends through a slotted opening 152 in the lower end of the support bar 138. The tag axle bolt 150 is free to slide along the length of slot 152 in support bar 138 so that the tag axle connection is likewise vertically adjustable.

Figure 16:
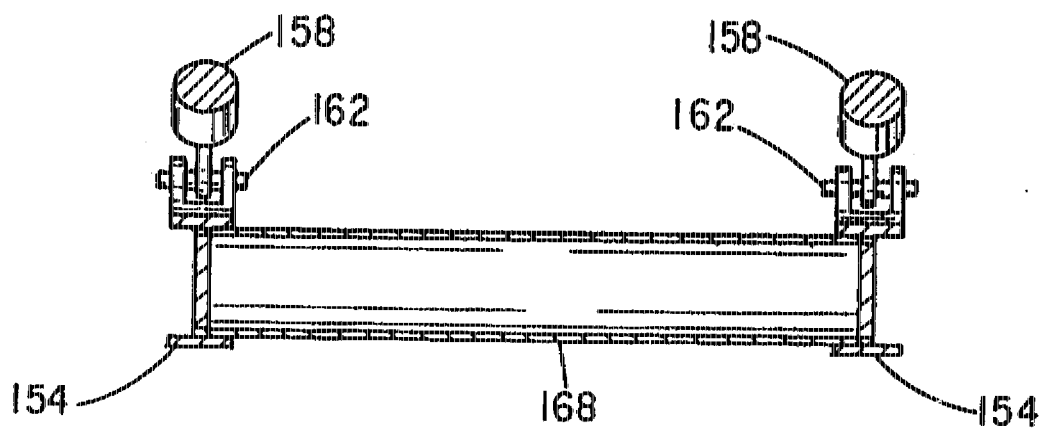
FIG. 16 is a fragmentary detail taken along the line 16—16 of FIG. 13 showing the torque tube connecting tag axle assemblies on each side of the truck.

The tag axle 136 may be any tag axle including those operated by pneumatic or hydraulic fluid operated actuators and may be of the steerable or nonsteerable variety and may have stub axles or through axles. As shown in FIGS. 13, 15, and 16, the tag axle 136 includes an axle mounting lever 154 pivotally attached to the slide plates 146 and 148 on pin 156. A double acting hydraulic cylinder 158 is pivotally attached to the rear side plate 144 at 160 and to the axle mounting lever 154 at 162. Wheel 164 carried by a through axle 166 which is attached to the axle mounting lever 154 is moved between a ground engaging position, FIG. 13, and a raised or stowed position, FIG. 17. The torque tube 168 is attached to axle mounting levers 154 on each side of the vehicle or truck 20 for coordinating movement of the tag axle assembly 136.

In the embodiment of FIGS. 13 and 14, the socket 132 and tongue 134 are substantially congruent. In the latched and ground engaging position, forces from the wheel 164 are transferred from the axle mounting lever 154 and hydraulic cylinder 158 through the tongue 134 and socket 132 to the frame 24. The tongue base 182 is lifted up to engage the socket mouth 170 and the tongue tip 176 is forced down to engage the inner portion of the socket 132. The tongue maximum width 180 is forced against the socket maximum width 172 at the top thereof and the tongue minimum width 178 is forced against the socket minimum width 174 at the bottom thereof to latch the tongue 134 into the socket 132. This securely retains the tongue 134 in the socket 132 and transfers forces from the ground engaging tag axle 136 to the frame 24 of the truck 20. The support bar 138 is loosely fit into the tag axle support 140 and the tag axle bolt 150 is spaced from the top and bottom of the slotted opening 152 in the support bar 138 such that no forces are transferred from the ground engaging tag axle 136 to the tailgate 26.

In the inserted and stowed position the tag axle 136 hangs from the socket 132 and tongue 134 arrangement. In this situation, the lower part of the tongue base 182 and tongue maximum width 180 engages the lower portion of the socket mouth 170 and socket maximum width 172. Correspondingly, the top of the tongue tip 176 and tongue minimum width 178 engage the top of the inner portion of the inner socket 132 and socket minimum width 174. This latches the tongue 134 into the socket 132 and transfers forces from the hanging tax axle 136 to the frame 24. The loose connection between the tailgate 26 and tag axle 136 precludes transferring any forces from the hanging tag axle 136 to the tailgate 26.

As shown in FIG. 17, the tongue 134 is disengaged from the socket 132 by lifting and raising the vertically displaceable tailgate 26. As the tailgate 26 is raised vertically, the bolt or pin 150 slides to the bottom of the slot 152 which allows the tailgate 26 to be raised while the tongue 134 remains in the socket 132. As the tailgate opens, the tag axle 136 hangs suspended from it but out of the way of material being discharged. The tailgate 26 is closed to latch the tag axle 136 into place by inserting the tongue 134 in the socket 132 and lowered vertically to engage the body and tailgate hooks.

Figure 18:
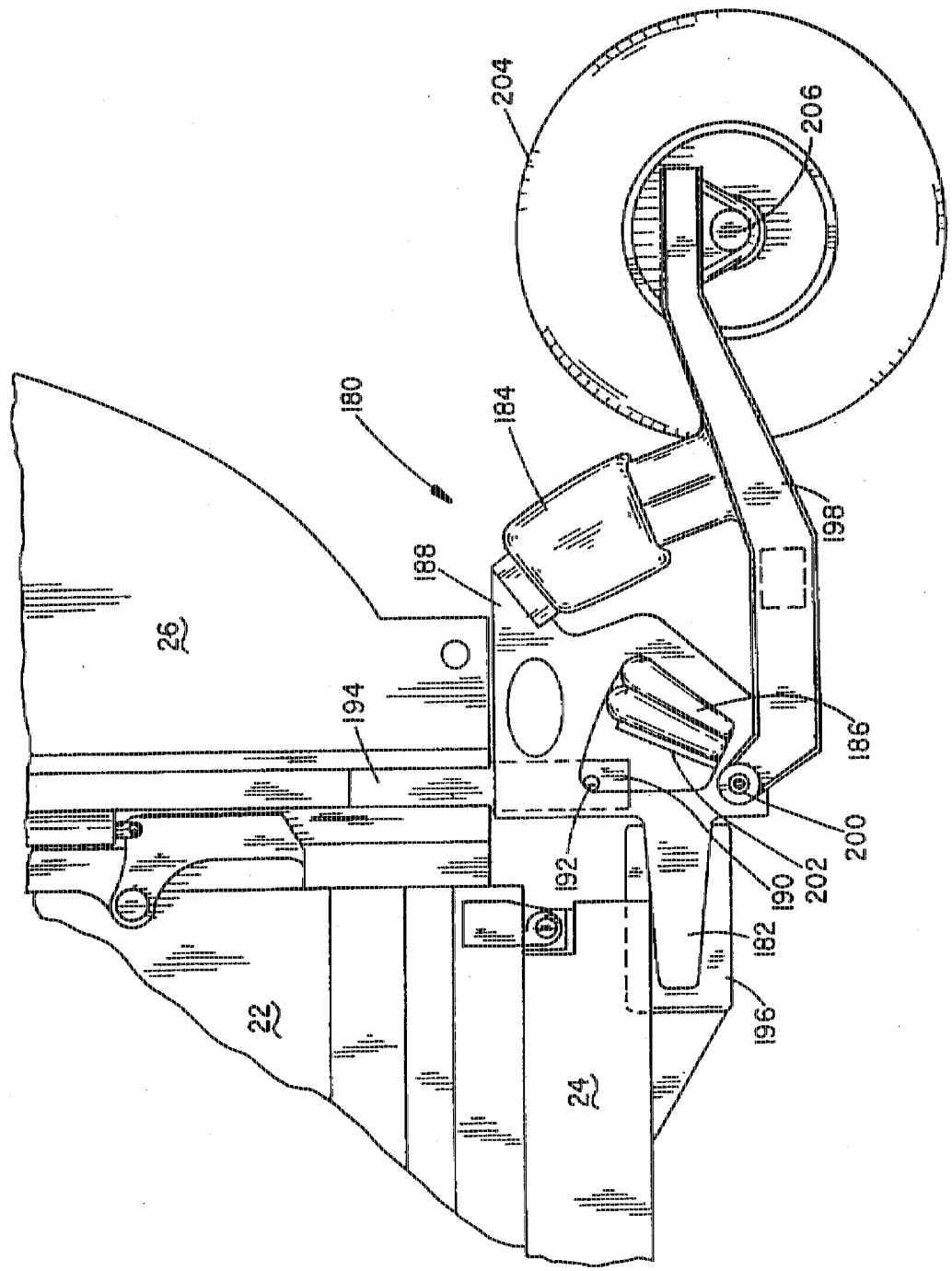
FIG. 18 is a greatly enlarged, fragmentary side view of the rear of a vehicle showing a pneumatic bellows-operated tongue and socket latching mechanism in the deployed position.
Figure 19:
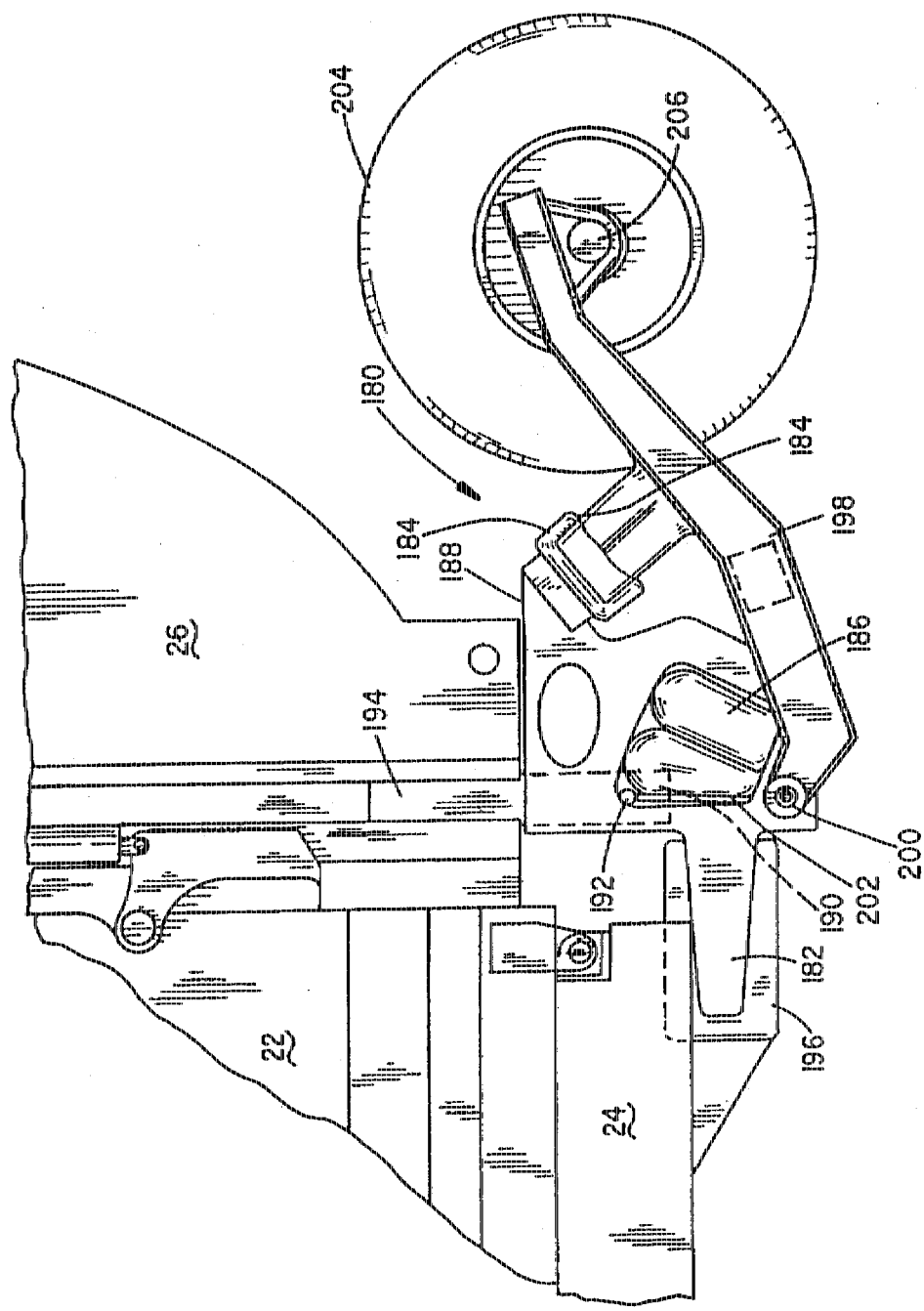
FIG. 19 is a view similar to FIG. 18 showing the tag axle in the stowed position.

Of course, tongue and socket embodiments may be used with any suitable actuators. FIGS. 18 and 19 illustrate a pneumatic system in which the tag axle 180 including an attached tongue 182 is operated by pneumatic bellows 184 and 186 between a ground engaging position and a stowed position. The tag axle 180 includes a tag axle base 188 which is attached to the tongue 182 and a tag axle support 190 which has side plates forming a rectangle and a tag axle bolt 192 therethrough. A support bar 194 is attached to the tailgate 26 and the tag axle bolt 192 fits through a slotted opening (not shown) in support bar 194 providing a slidable connection for slack connecting the tag axle 191 to the tailgate 26. The tongue 134 slidably fits into a socket 196 which is attached to the frame 24. The tongue and socket arrangement and the connection between the tailgate 26 and the tag axle 180 operate as previously described.

The tag axle pneumatic bellows 184 is connected to the tag axle frame 188 and the axle mounting lever 198 which is pivotally attached to the tag axle frame 188 at 200. A torque lever arm 202 is attached to the axle mounting lever 198 at the pivot 200 to pivot with the axle mounting lever 198 and pneumatic bellows 186 is attached to the tag axle frame 188 and the torque lever arm 202. A wheel 204 is attached to a axle 206 which is attached to the axle mounting lever 198. The wheel 204 is lowered to the ground engaging position by expanding pneumatic bellows 184 and retracting pneumatic bellows 186. Conversely, retracting pneumatic bellows 184 and expanding pneumatic bellows 186 raises the wheel 204 to the stowed position.

FIGS. 20 to 26 illustrate another embodiment of tag axle latching mechanism which involves a removable, locking wedge device. Each tag axle wheel assembly, depicted generally at 210, is quite similar to tag axle 136 and may be deployed and stowed by pneumatic bellows as well as by the fluid (hydraulic) cylinders illustrated in FIGS. 20–26. Such interchangeability of operating devices is an attribute substantially similar to those already described in conjunction with other embodiments and need not be repeated here. The assembly 210 includes a socket or pocket 212 that is substantially larger than a generally wedge-shaped engageable force transferring member or torque tongue 214. As in the embodiment described above, the socket is securely attached to the truck frame and the tongue is an integral part of the tag axle.

Each socket or torque tongue pocket 212 further includes an end and top spacer block 216 and front and rear rest blocks 220 and 222, respectively, secured to the frame of the vehicle. The torque tongue 214 is provided with a shaped, usually rounded or arcuate recess 224 (FIG. 22) dedicated to receive or accommodate a locking pin 226 of like shape when in the locked position (FIG. 20) as will be discussed more fully below.

The tag axle system 210 is permanently mounted on or hung from the tailgate 26, itself a top-hinged vertically displaceable, bottom opening swinging tailgate of a type which has been previously discussed as being attached to truck body 22. Latching and vertical operation may be accomplished using heavy body hooks fastened to the truck body as at 223 which receive pins fixed to the tailgate as at 225 when the tailgate is closed and then lowered into position. The tailgate is raised and lowered to disengage and engage the hooks 223 and pins 225, as required, by cylinder 227 with hinge pins 228 free to operate in hinge slots 229 as has been described in regard to other embodiments.

Figure 20:
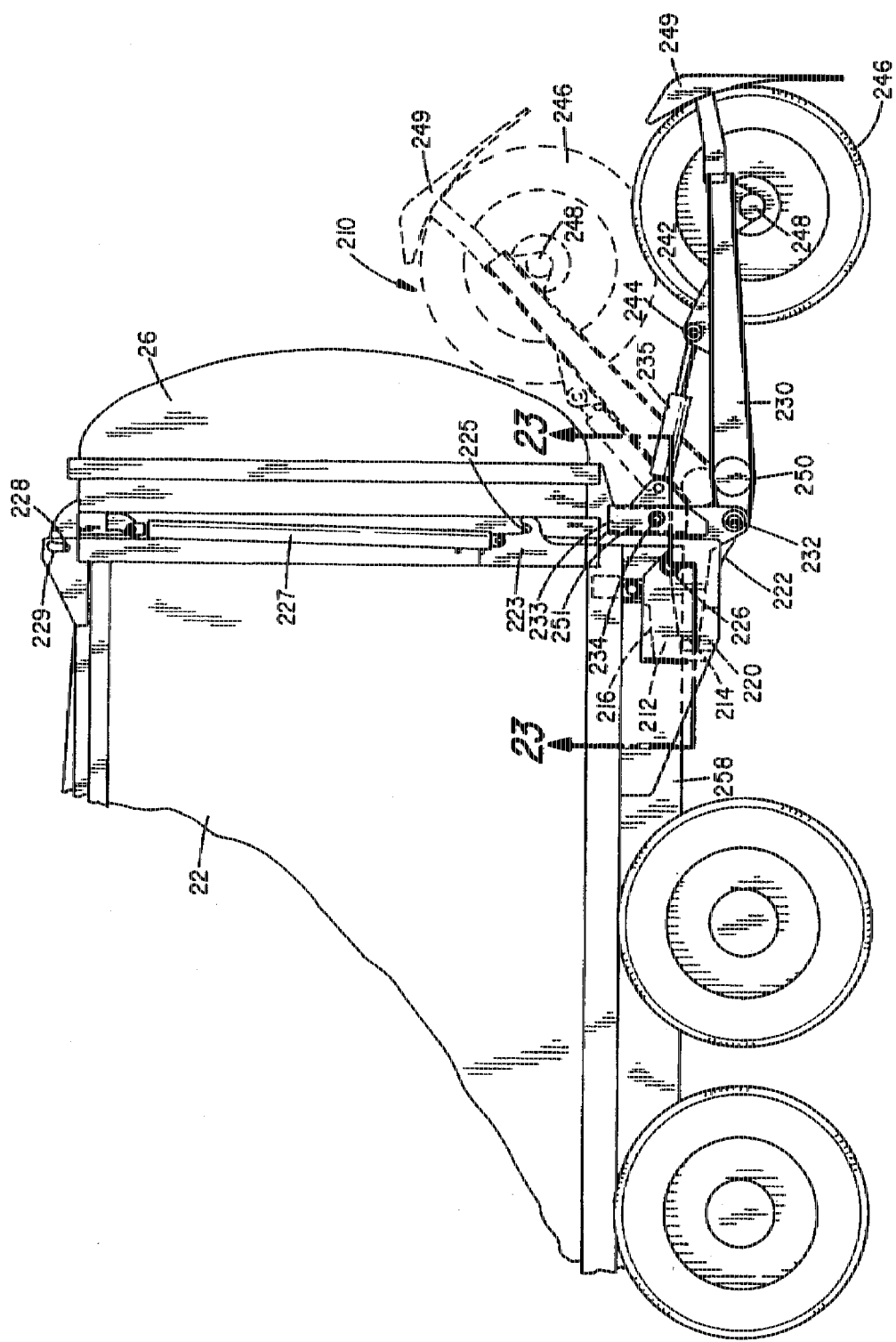
FIG. 20 is a fragmentary side view of the rear of a vehicle including an alternative tongue and socket tag axle latching mechanism in a locked, deployed position with the raised or stowed position shown in broken lines.
Figure 21:
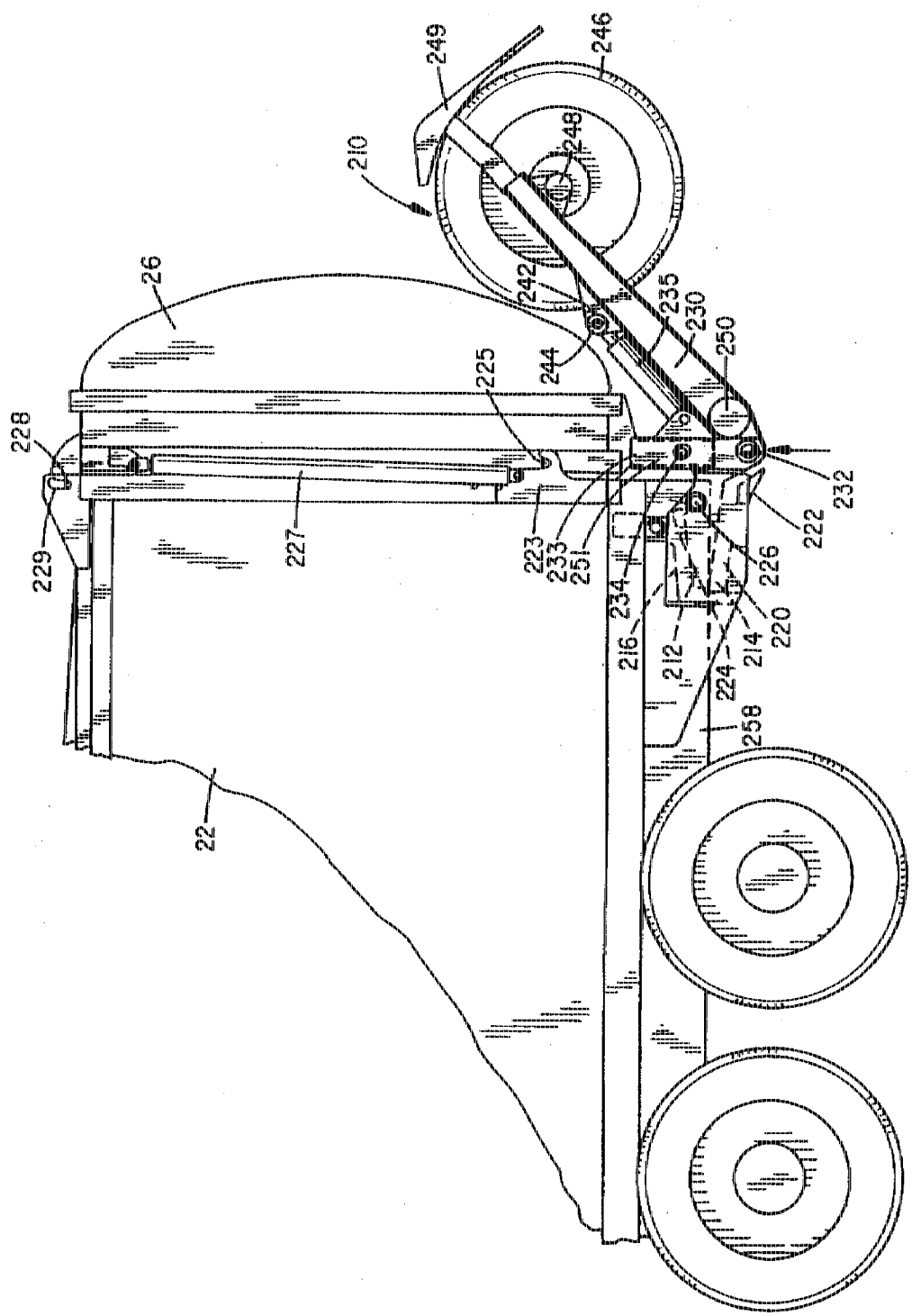
FIG. 21 is a view similar to FIG. 20 showing the locking pin unlocked, the tailgate vertically displaced and tag axle raised.
Figure 22:
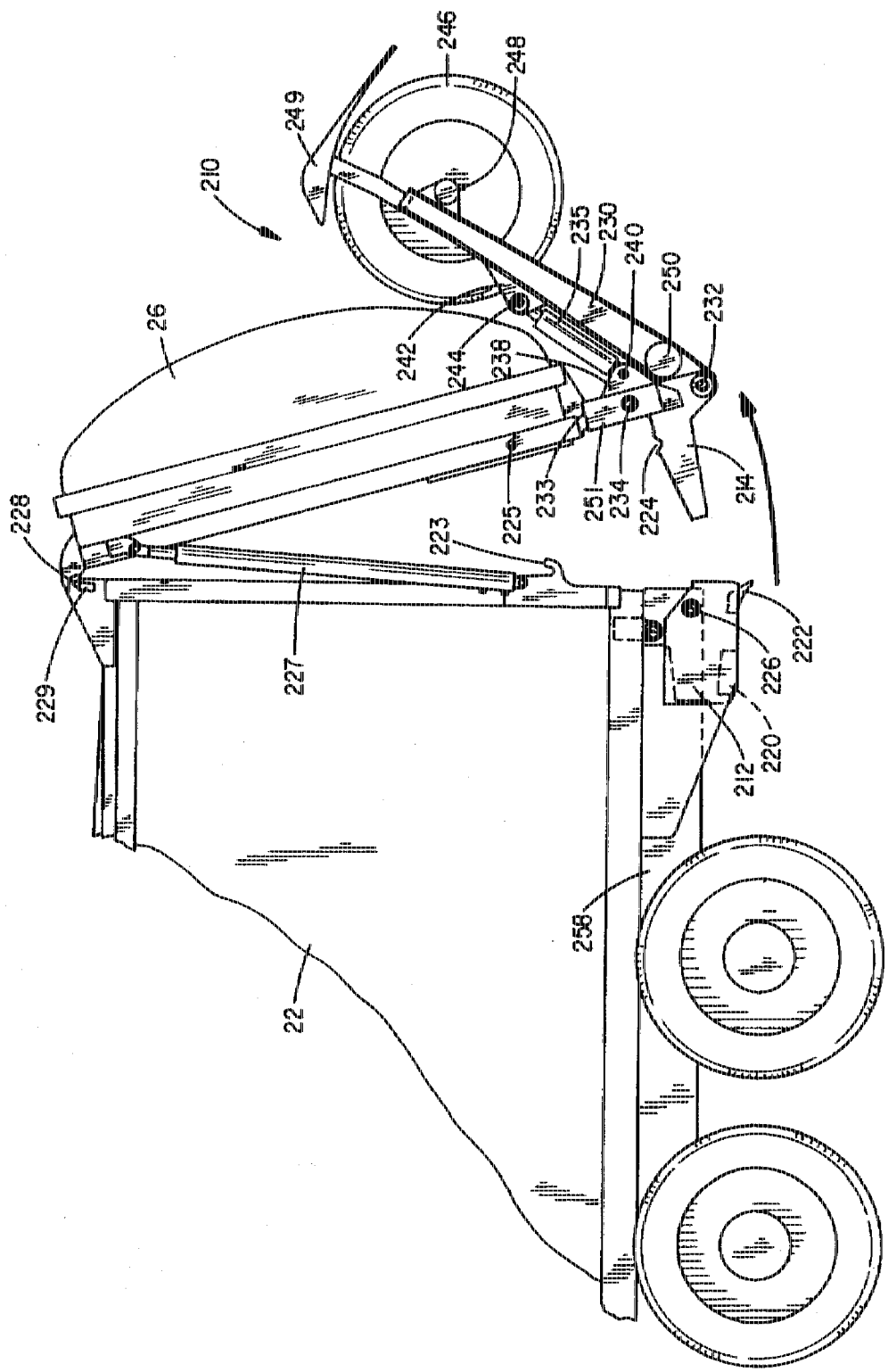
FIG. 22 is a fragmentary view similar to FIG. 21 with the tailgate partially opened.

The tag axle system includes a pair of spaced oppositely disposed tag wheel assemblies 210 and, as stated above, may be of any compatible tag axle species including those operated by pneumatic or hydraulic actuators, those of the steerable or nonsteerable varieties and those having stub axles or through axles. As shown in FIGS. 20–22, each tag wheel assembly includes an axle mounting lever 230 which is pivotally mounted about a pin 232 with respect to torque tongue 214 and the assembly is attached to the tailgate using a heavy support pocket 233 (FIGS. 23 and 24) and using bolts as at 234. In this manner, heavy axle support lugs 251 are inserted in pockets 233 with sufficient play to avoid interference with the transfer of support via the torque tongue 214 to the truck frame members 258. The size of the tongue relative to the pocket 212 is also such that a slight amount of lateral space as at 253 is also provided between the torque tongue 214 and pocket side plates 252 and 254. The side plates 252 and 254 are flared at 256 to facilitate alignment of torque tongue 214.

In each assembly, double acting hydraulic cylinder 235 is pivotally attached between a pair of rear side plates 236 and 238 using a pin 240 and axle mounting lever 230 via gusset 242 at 244 (FIGS. 20–22). Tag wheels 246 for both tag wheel assemblies are carried by a through axle 248 which is attached to the axle mounting lever 230 and are moved between a ground engaging position and a raised or stowed position as shown in the figures. Mud protection is provided by a guard 249. A heavy torque tube 250 is attached to connect and stabilize the structure between axle mounting levers 230 located on either side of the vehicle or truck to assure coordinated movement of the tag axle assemblies.

As shown in the figures, with each torque tongue 214 fully inserted in the corresponding pocket 212 and the tailgate lowered, the locking pin 226 may be received in recess 224 to lock the torque tongue in place and, as best seen in FIG. 20, the torque tongue drops down with the tail gate and addresses the rest blocks 220 and 222. In the deployed position, the support force of the ground pushing up on the tag wheels 246 wedges the tongue against the front rest block 220 and the support force of the deployed wheel is carried or transferred by the pin 226 to the truck frame.

Figure 23:
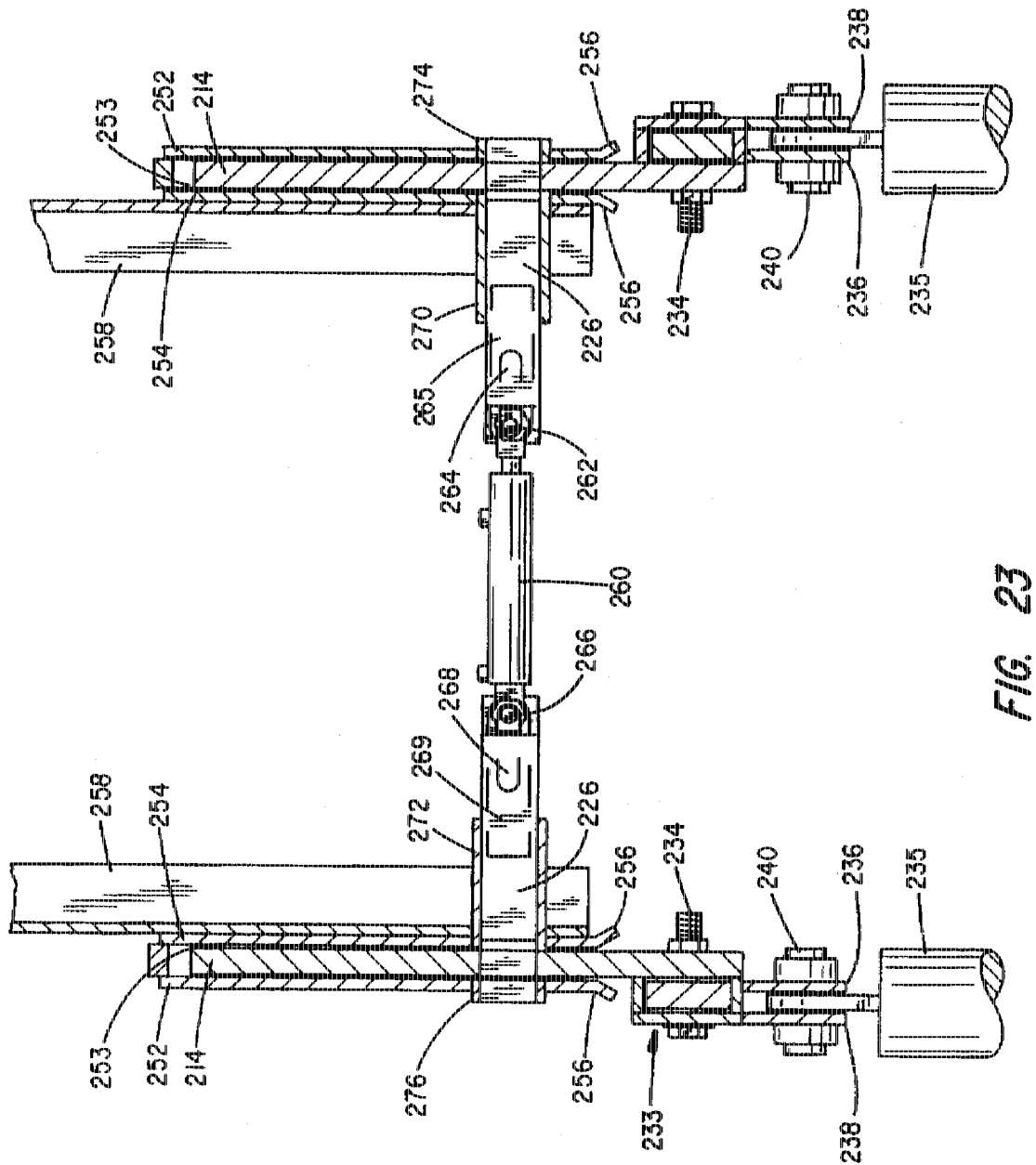
FIG. 23 is an enlarged fragmentary sectional view taken along line 23—23 of FIG. 20 showing the locking pins in a withdrawn or unlocked position.
Figure 24:
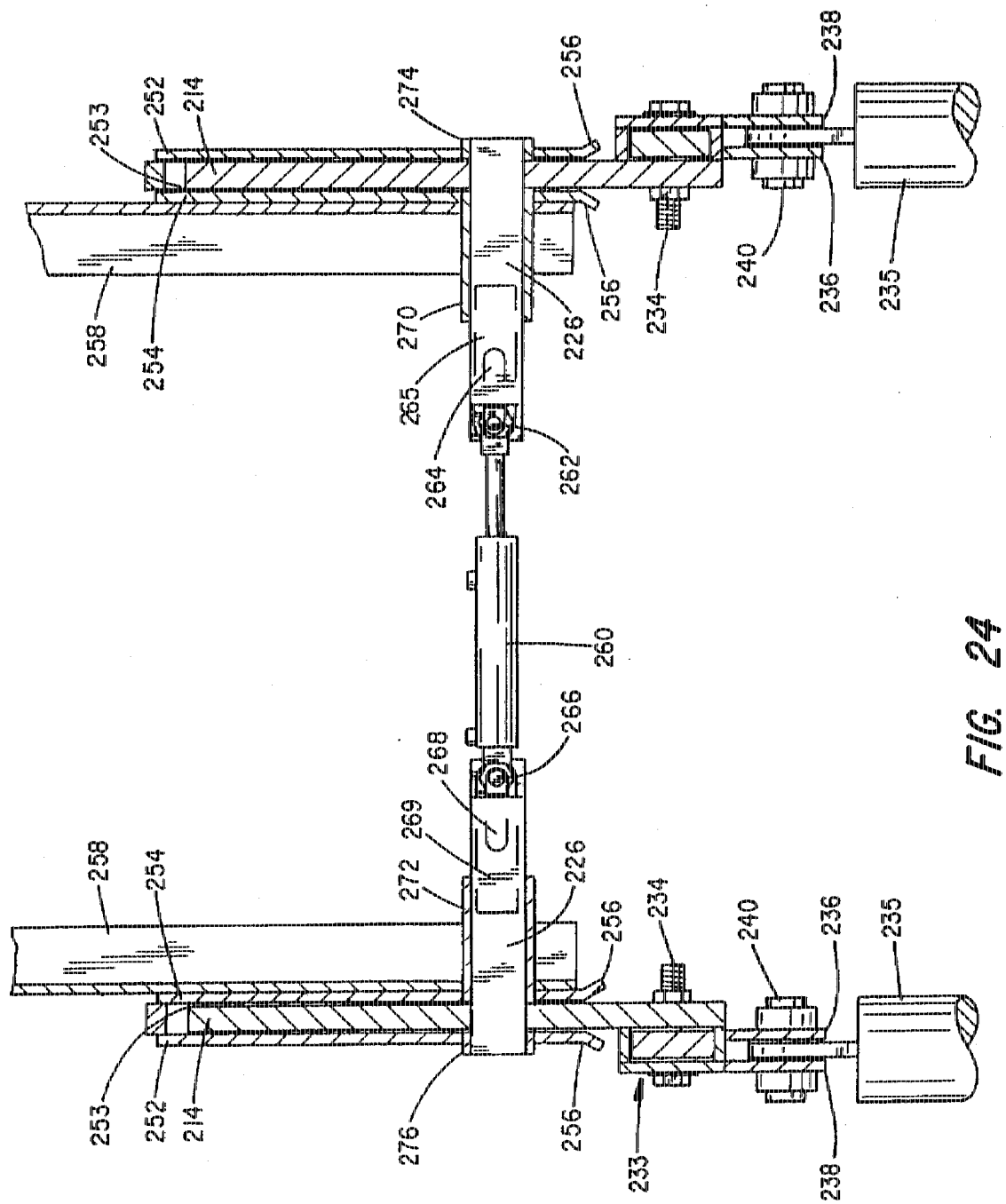
FIG. 24 is a view similar to FIG. 23 showing the locking pins in the extended or locked position.

The pin operating system is shown in the fragmentary sectional views of FIGS. 23 and 24. Each system includes a linear operator in the form of a double acting hydraulic cylinder or other actuator 260 with rod ends attached by a pin 262, which in turn, moves along a guide slot 264 in a member 265 and at the cylinder end at by a pin, 266 which operation guide slot 268 in a member 269. The pair of oppositely disposed slotted members 265 and 269 are fixed to a pair of tubular guides 270 and 272, respectively. The locking pins 226 are connected to the linear operators 260 by pins 262 and 266 and operated reciprocally in tubular guides 270, 272 and outer guide sleeves 274, 276. Expansion of the linear actuator 260 advances the locking pins 226 into their locked position across tongues 214 as shown in FIG. 24 and retraction of the linear actuator retracts the locking pins 226 clear of tongues 214 as per FIG. 23. The guide slots prevent rotation of the locking pins and control or limit pin stroke so that both pins will lock or unlock in unison.

As can be seen in FIG. 21, with the pins withdrawn beyond the tongue, the unlocked torque tongue 214 is free to be raised vertically with the tailgate. It is important to note that the unlocked, raised torque tongue 214 is also free to move with the tailgate and is easily withdrawn as the tailgate swings free (FIG. 22) as the tongue member 214 is much smaller than the pocket 212 and cannot become jammed therein. This embodiment gives the force transfer aspect of the invention all of the positive advantages of a torque tongue or wedge system without the possible limitations associated with close tolerances between wedge and socket dimensions.

Figure 25:
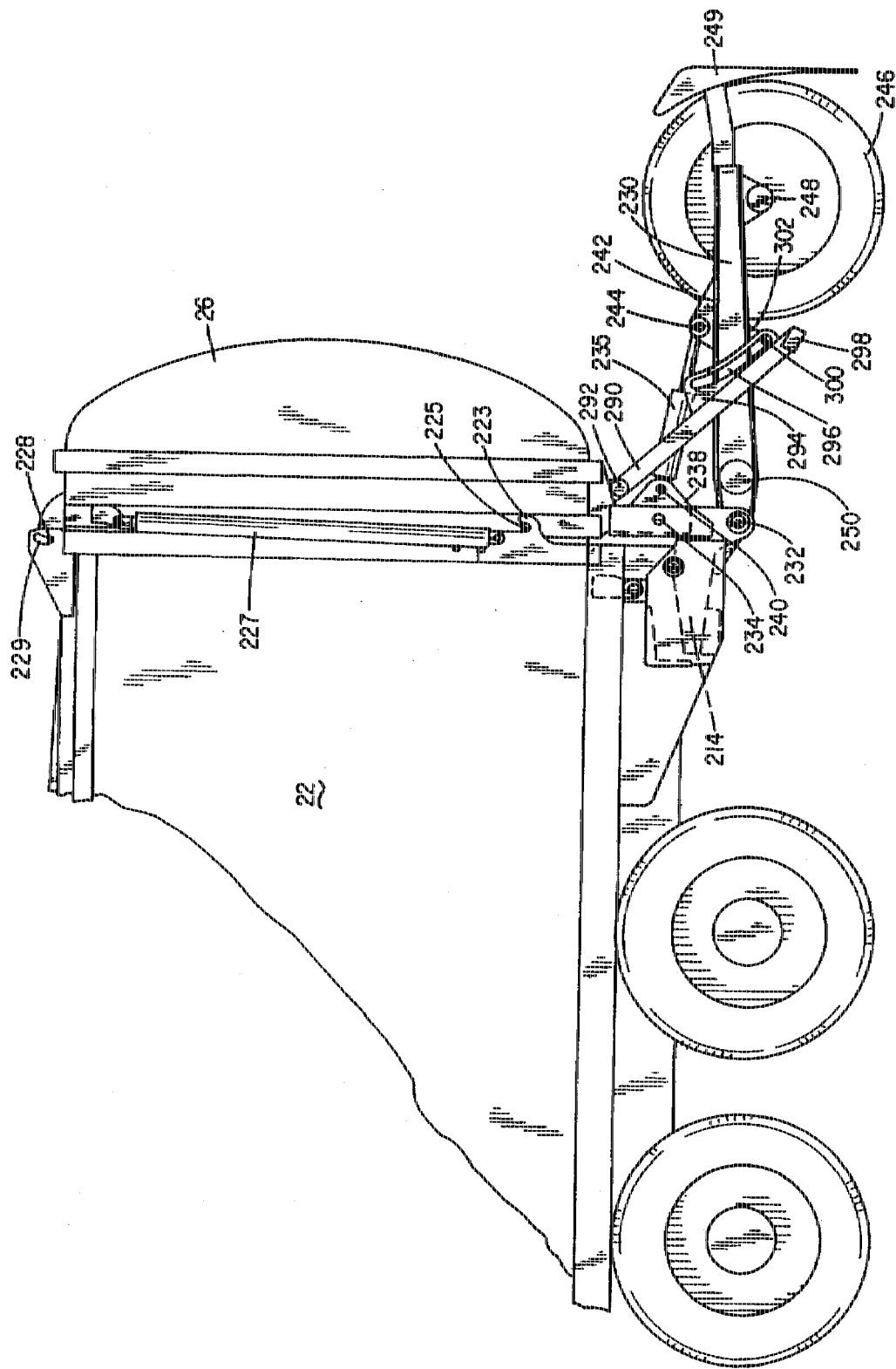
FIG. 25 is an enlarged, fragmentary side view of the rear of a vehicle illustrating a bumper system for use with the tag axle system of the invention with the tag axle in the deployed position.

FIGS. 25 and 26 further illustrate a protector bumper system for use with the tag axle system of the invention in which a pair of spaced bumper arms located outside of the axle arms 230 at 290 are pivotally connected at 292 and have attached cam plates 294 which include cam slots 296 carry a heavy bumper crossbar member 298 which extends the full width of the tag axle tires. The bumper pivots with the raising and lowering of the tag wheels as operated by cam followers 300 which operate in cam slots 296 and are fixed to gussets 302 attached to the axle mounting levers 230.

Of course, as in the case of other embodiments, and as has been stated, it is understood that the torque tongue and socket embodiment of FIGS. 20–26 may be used with many different tag axle styles and different operating mechanisms such have been illustrated in connection with other embodiments, and those variations should not need further illustration here.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention.

What is claimed is:

1. A tag axle system for a vehicle having a frame and a body including a tailgate carried by said frame, comprising:
   a vehicle having a frame and a body including a tailgate carried by said frame;
   (b) a tag axle system connected to the tailgate;
   (c) latch means attached to said tag axle system and the frame for directing supporting forces associated with said tag axle system through the frame, said latch means comprising opposed engaging means comprising a corresponding tongue and socket arrangement; and
   (d) latch locking means including slidable locking pin means for releasibly locking said tongue in said socket.

2. The apparatus of claim 1 wherein said slidable locking pin is connected to a linear operator.

3. The apparatus of claim 1 wherein said socket is larger than said tongue and wherein said locking pin engages a shaped recess in said tongue when said tongue is in a locking disposition in said socket.

4. The apparatus of claim 1 wherein said tongue is carried on said tag axle system and said socket is carried on said frame.

5. The apparatus of claim 3 wherein said tongue is positioned in said locking disposition by operation of said tailgate.

6. The apparatus of claim 2 wherein said tag axle system comprises a pair of connected tag axle assemblies each associated with one side of said tailgate.

7. The apparatus of claim 6 further comprising a pair of oppositely disposed locking pins connected by a common linear operator.

8. The apparatus of claim 7 wherein said common linear operator includes a doubled-ended, double acting cylinder and further comprises compensation means to produce concerted operation of the oppositely disposed pins.

9. The apparatus of claim 3 wherein said tailgate is vertically disposable and said tag axle system is connected to said tailgate in the manner such that vertical displacement of the tailgate produces vertical displacement of the tongue, said vertical displacement thereby positioning said tongue in said socket in said locking disposition when said tailgate is in a fully closed and lowered position.

10. A tag axle latching mechanism and tailgate combination for a vehicle having a frame, the combination comprising:
   (a) a vertically displaceable tailgate pivotally attached to the vehicle for being displaced vertically from a closed position and pivoted to an open position;
   (b) a tag axle system;
   (c) a pair of spaced latch means attached to said tag axle system and the frame for directing supporting forces associated with said tag axle system through the frame said latch means comprising opposed engaging means further comprising corresponding tongue and socket arrangements;

(d) latch locking means for locking each said tongue in a corresponding socket; and (e) mounting means for connecting said tag axle system to said tailgate such that the engaging means of each said latch means aligns as said tailgate is operated between said closed and said open positions.

11. The combination as in claim 10 wherein said latch means comprises a pair of slidable locking pins each associated with a tongue and socket arrangement and a common linear operator connected to said slidable locking pins for operating said locking pins between a locked and unlocked position.

12. The apparatus of claim 11 wherein said socket is larger than the corresponding tongue and wherein each said lock pin engages a shaped recess in said tongue when said tongue is in a locking disposition in said socket.

13. The apparatus of claim 12 wherein said tongue is aligned in said latching disposition by the vertical lowering of said tailgate.

* * * * *